United States Patent
Solh et al.

(10) Patent No.: US 11,257,226 B1
(45) Date of Patent: Feb. 22, 2022

(54) LOW-OVERHEAD MOTION CLASSIFICATION

(71) Applicant: Amazon Technologies, Inc., Seattle, WA (US)

(72) Inventors: Mashhour Solh, San Jose, CA (US); Amr Bakry, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 16/515,014

(22) Filed: Jul. 17, 2019

(51) Int. Cl.
```
G06T 7/254      (2017.01)
G06T 3/40       (2006.01)
G06K 9/62       (2006.01)
G06F 17/18      (2006.01)
H04N 7/18       (2006.01)
```

(52) U.S. Cl.
CPC .............. G06T 7/254 (2017.01); G06F 17/18 (2013.01); G06K 9/6215 (2013.01); G06K 9/6269 (2013.01); G06T 3/4084 (2013.01); H04N 7/185 (2013.01); *G06T 2207/10016* (2013.01)

(58) Field of Classification Search
CPC .................. G06T 7/254; G06T 3/4084; G06T 2207/10016; G06K 17/18; G06K 9/6215; G06K 9/6269; H04N 7/185
See application file for complete search history.

(56) References Cited

U.S. PATENT DOCUMENTS

| | | | | |
|---|---|---|---|---|
| 5,091,780 A * | 2/1992 | Pomerleau | ......... | G06K 9/00771 348/152 |
| 9,715,903 B2 * | 7/2017 | Gupte | ................ | G11B 27/3081 |
| 10,743,143 B1 * | 8/2020 | Devison | .................. | H04W 4/33 |
| 2007/0182819 A1 * | 8/2007 | Monroe | ........... | G08B 13/19656 348/143 |
| 2009/0110299 A1 * | 4/2009 | Panahpour Tehrani | ...... | G06T 7/277 382/224 |
| 2017/0277941 A1 * | 9/2017 | Smith | ................ | G06K 9/00335 |
| 2018/0342070 A1 * | 11/2018 | Chen | .................. | G06K 9/00744 |
| 2020/0250836 A1 * | 8/2020 | Li | ........................... | G06T 7/155 |

OTHER PUBLICATIONS

Ruichi Yu et al., ReMotENet: Efficient Relevant Motion Event Detection for Large-scale Homer Surveillance Videos, arXiv:1801.02031v1 [cs.CV], Jan. 6, 2018, 11 pgs.

\* cited by examiner

*Primary Examiner* — Vu Le
*Assistant Examiner* — Winta Gebreslassie
(74) *Attorney, Agent, or Firm* — Lee & Hayes, P.C.

(57) ABSTRACT

A method of classifying motion from video frames involves generating motion frames indicative of changes in pixel values between pairs of frames. The method also involves determining one-dimensional feature values based on the video frames or motion frames, such as the statistical values or linear transformation coefficients. Each one-dimensional feature value may be stored in a buffer, from which additional temporal feature values can be extracted indicative of the change of the one-dimensional feature values across a set of frames. A classifier may receive the one-dimensional feature values and the additional temporal feature values as inputs, and determine the class of motion present in the video frames. Some classes of motion, such as irrelevant motion, may be considered irrelevant to the execution of certain motion-triggered actions, such that the method may involve suppressing the performance of a motion-triggered action based on the determined class of motion.

25 Claims, 14 Drawing Sheets

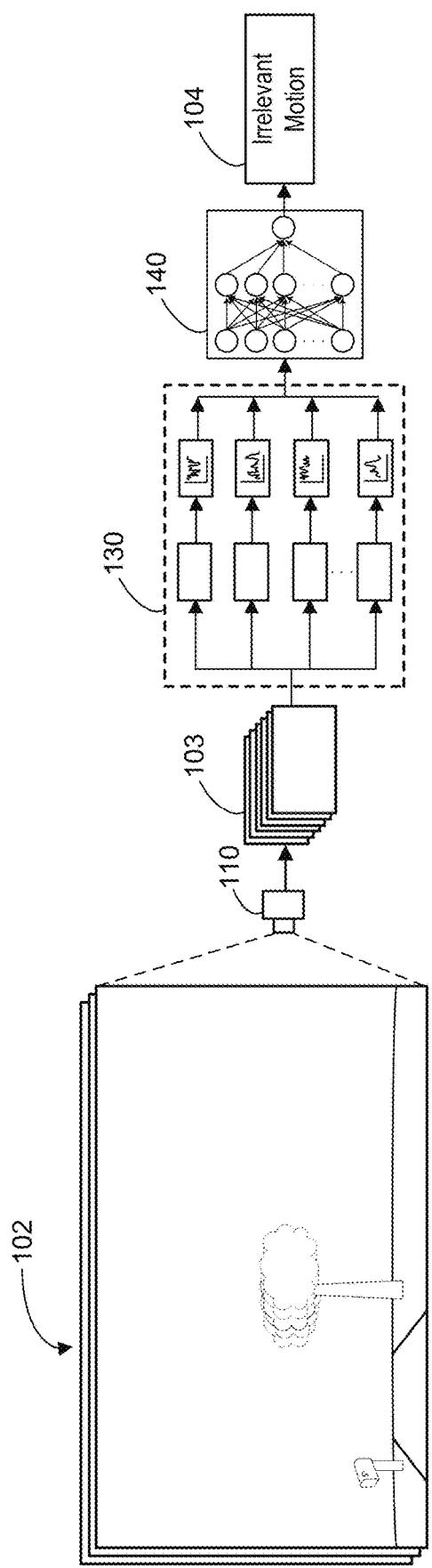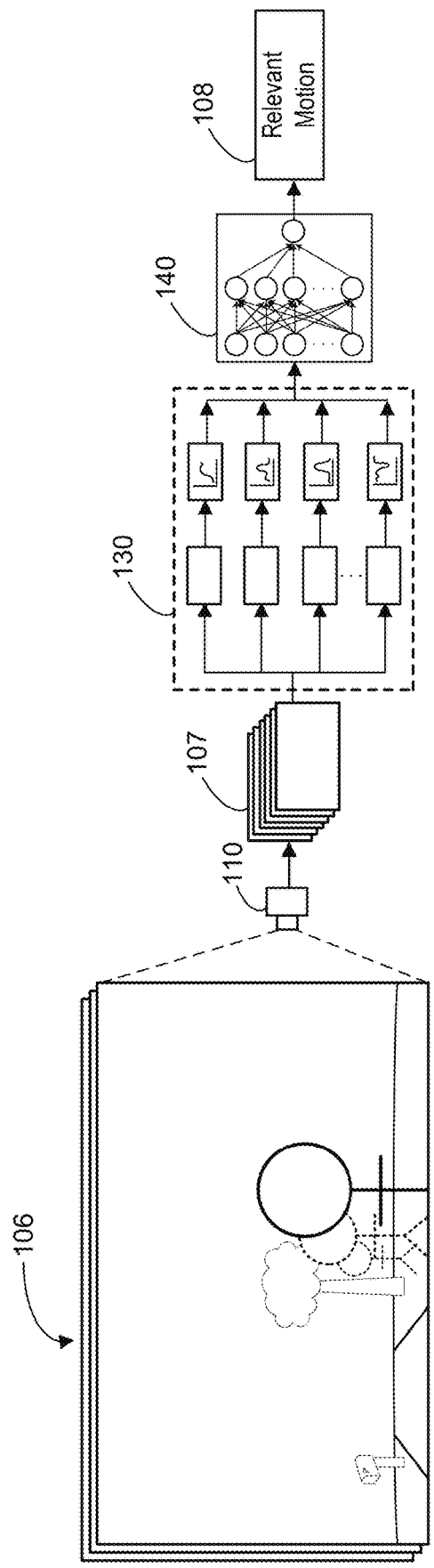

LOW-OVERHEAD MOTION CLASSIFICATION

BACKGROUND

Home security is a concern for many homeowners and renters. Those seeking to protect or monitor their homes often wish to have video and audio communications with visitors, for example, those visiting an external door or entryway. Audio/Video recording and communication devices (A/V devices), such as video doorbells, provide this functionality, and can also aid in crime detection and prevention. For example, audio and/or video recorded by an A/V device can be uploaded to the cloud and recorded on a remote server, or analyzed on-device. Subsequent review of the A/V footage can aid law enforcement in capturing perpetrators of home burglaries and other crimes. Further, the presence of one or more A/V devices on the exterior of a home, such as a doorbell unit at the entrance to the home, acts as a powerful deterrent against would-be burglars.

SUMMARY

The various embodiments of the present methods, devices, and systems for performing motion classification with limited processing power have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Traditional motion detectors, such as pyroelectric infrared (PIR) sensors, are used in various devices to trigger the performance of certain actions. For instance, existing home security systems may include one or more motion detectors that can detect movement within a home, workplace, or other premises. Although traditional motion detectors can sense movement within a field of view, such detectors cannot distinguish between different types of motion. As a result, traditional motion detectors can be triggered by movement that is of little to no relevance to the purpose being served by the detector. In the context of home security, for example, a PIR sensor may detect the movement of trees or bushes swaying in the wind, which may trigger a home security alarm, despite the motion presenting no security threat.

In addition, advances in computer vision have led to the development of robust object detection and image classification models that are capable of identifying a broad range of objects from images and videos. Deep learning models based on convolutional neural networks, for example, can accurately perform complex classification tasks, such as facial recognition and medical image analysis. However, such complex and precise models typically require substantial computing power to perform, and may not be able to perform classification in real time or near-real time. Many precise image classification techniques involve extracting edges, patterns, and/or shapes from images, which may be computationally expensive operations when performed on detailed, high-resolution images.

The implementation of such robust image processing algorithms on consumer devices has remained an ongoing challenge. Devices may be equipped with advanced processors with substantial computational capabilities, but the integration of more powerful hardware leads to increased costs for the device, as well as increased power consumption, which can be problematic for battery-powered devices. Alternatively, devices may serve as data collection endpoints that transmit information to backend servers for processing. However, reliable backend processing requires a stable network connection, introduces a delay in processing the information, and may raise privacy concerns for some consumers. At least some embodiments of the present disclosure solve these problems by providing methods, apparatuses, and systems capable of performing motion classification on recorded video on devices with limited computing power.

The present disclosure includes the realization that different types of motion (e.g., irrelevant motion, relevant motion, no motion, etc.) in a video or sequence of images can be distinguished based on one-dimensional (1-D) features. Statistical values (e.g., mean, standard deviation, correlation coefficient, etc.) and frequency domain values (e.g., coefficients for the discrete cosine transform (DCT), discrete Fourier transform (DFT), fast Fourier transform (FFT), etc.) can be extracted from video frames themselves, or processed video frames. The values of these 1-D features over a period of time may be indicative of the consistency across video frames, the consistency of motion across video frames, the amount of the field-of-view that changes across video frames, and the location of movement within and across video frames. One or more of these 1-D features may be used to train a classifier, such as a multi-layer perception (MLP) network, to distinguish between motion that is irrelevant (e.g., a tree swaying in the wind) and motion that is relevant (e.g., a person). Beneficially, the 1-D features can be calculated and the motion classifier can be executed on devices with limited processing power. As a result, low-power or inexpensive camera-equipped devices may be able to determine whether motion within recorded video is irrelevant or relevant and, in turn, perform or suppress the performance of an action.

BRIEF DESCRIPTION OF THE DRAWINGS

The various embodiments of the present methods, devices, and systems for performing motion classification with limited processing power now will be discussed in detail with an emphasis on highlighting the advantageous features. These embodiments depict the novel and non-obvious methods, devices, and systems for performing motion classification with limited processing power shown in the accompanying drawings, which are for illustrative purposes only. These drawings include the following figures, in which like numerals indicate like parts:

FIGS. 1A and 1B are a schematic diagram illustrating example processes for classifying motion from recorded video frames, according to various aspects of the present disclosure;

DETAILED DESCRIPTION

Figure 2:
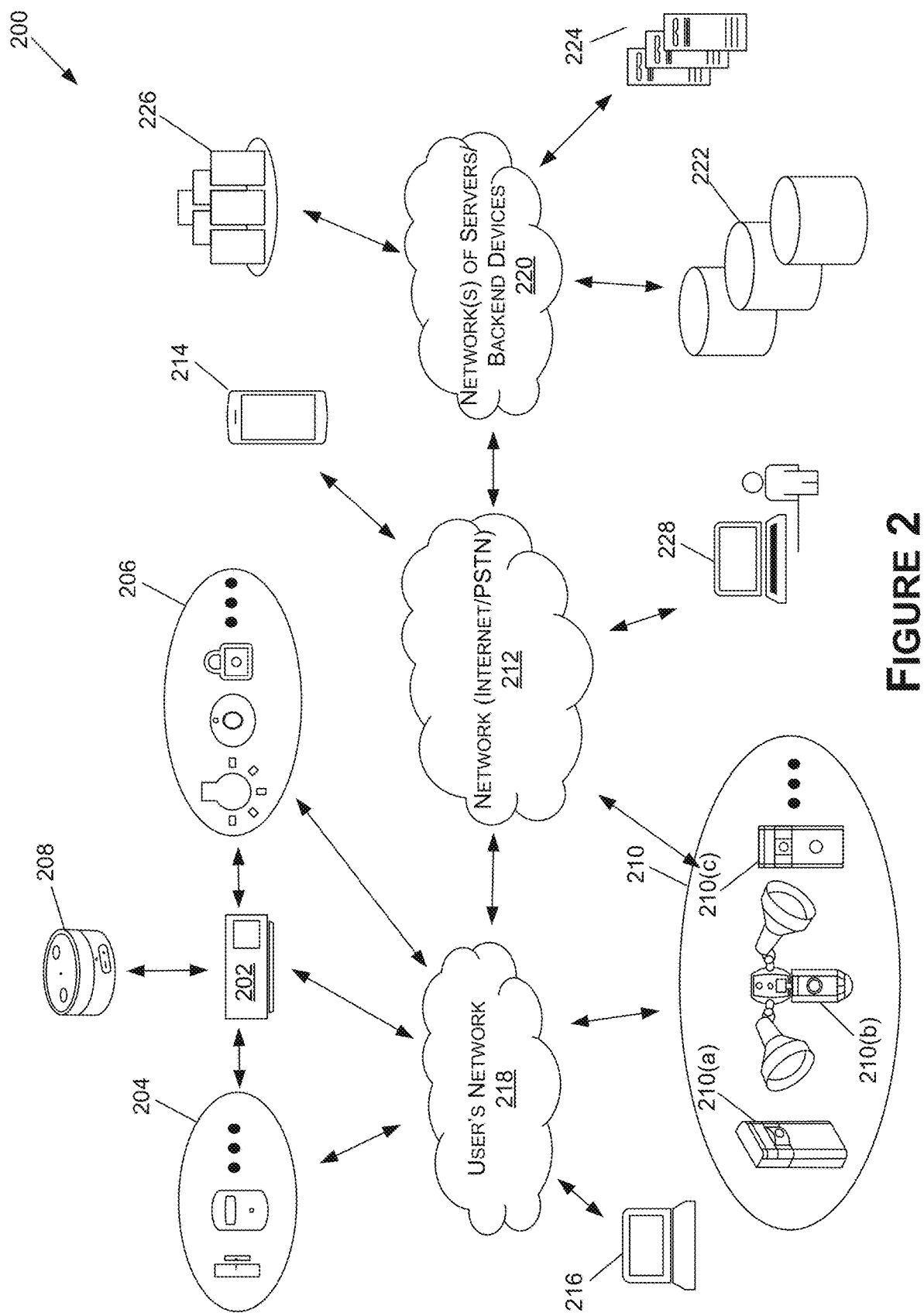
FIG. 2 is a schematic diagram illustrating an example system for communicating in a network, according to various aspects of the present disclosure.

Example embodiments of the present disclosure involve the development, training, and implementation of low-overhead, computationally inexpensive classifiers capable of distinguishing between different types of motion from recorded video. The present application contemplates that the task of discerning between irrelevant motion (e.g., motion corresponding to events that a user is unlikely to want to see), and relevant motion (e.g., motion corresponding to events that a user is likely to want to see) can be achieved with little spatial information. Some examples of irrelevant motion include, without limitation, wind-induced motion of trees, plants, flags, etc., and motion of vehicles and animals. One example of relevant motion includes, without limitation, motion of persons.

In practice, predicting the category of movement within the field-of-view of a camera based on the methods disclosed herein can enable a device to perform "smart" motion-based actions responsive to motion events that are relevant to the device or the user. For example, a security camera or computing device incorporating the motion classification techniques of the present application may be able to tag or label portions of recorded security footage of human-based motion, while ignoring or not tagging motion from cars, trees, or other non-relevant motion, which could not be accomplished using conventional motion detectors or PIR sensors. As another example, a camera-equipped home assistant device may provide prompts or display certain interfaces in response to a human approaching the device, but not responsive to other types of motion, using the motion classification techniques described herein.

Reducing the computational complexity of motion classification may involve the reduction or simplification of features often considered relevant to typical image processing and object detection algorithms, such as pixel color values and object edges and shapes extractable from high resolution images or video frames. In the present embodiments, some or all of these features may be downsampled (e.g., converting from color pixel values to grayscale pixel values, reducing a resolution of a video frame, etc.), such that subsequent processing steps can be performed with relatively inexpensive processing hardware.

In some instances, video frames may be processed to generate motion frames, which represent the change in pixel values between pairs of frames. In an example implementation, motion frames are generated as the absolute difference between respective pixels in a pair of frames, such that corresponding pixels that do not substantially change between the pair of frames have a resulting motion frame pixel value that is approximately zero. Conversely, corresponding pixels that change substantially between the pair of frames have a resulting motion frame pixel value that is well above (or below) zero.

One-dimensional (1-D) feature values are then extracted based on the video frames—from the original-quality frames, the downsampled frames, and/or the motion frames. For example, the mean value of the pixel values of a motion frame may provide a 1-D representation of the magnitude of the change in pixel values. As another example, the standard deviation of the pixel values of a motion frame may provide a 1-D representation of the variance among motion frame pixel values. Calculating a correlation coefficient value between a pair of original-quality or downsampled frames may provide a 1-D representation of the spatial consistency or frame consistency over time. In yet another example, one or more coefficients of the discrete Fourier transform (DFT) (e.g., the coefficient of the DFT at [0,0]) may be calculated for the pixel values of a motion frame, representing a component of a linear transformation for the motion frame. Other 1-D feature values, such as statistical features, frequency transformation coefficients, linear transformation coefficients, and/or other 1-D feature values may be determined based on the original-quality frames, the downsampled frames, and/or the motion frames (collectively, "frame information").

A classifier, network, or other machine learning tool may be trained on the basis of one or more 1-D feature values extracted from frame information to determine whether two or more frames are representative of a particular category of motion. For example, a classifier may be trained to distinguish between irrelevant motion and relevant motion. As another example, a classifier may be trained to distinguish between human motion, animal motion, and/or vehicle motion, among other types of motion. The present disclosure encompasses various categories of motion not explicitly discussed herein, which may be determined based on different signatures of one or more 1-D feature values over a period of time. As a specific example, an oscillation of the mean of the motion frame pixel values may be indicative of irrelevant (periodic) motion, such as the swaying of trees, bushes, or tall grass in the wind. However, a low-frequency shift in the mean of the motion frame pixel values may be representative of relevant (aperiodic) motion. The change of one or more of the 1-D feature values over time may provide a basis for distinguishing one type of motion from another.

Depending upon the particular implementation, the classifier may be configured, tuned, or otherwise designed to be embedded entirely on an end-user device (may also be referred to as an edge device), (e.g., stored in the device's memory and executed on the device's processor(s)), such as a video doorbell or security camera. In these implementations, a device may be configured to perform particular actions in response to detected motion, such as recording video, generating notifications, and/or prompting the user for input. A naïve motion sensor, such as a PIR sensor, may initially detect movement within the field-of-view of the device's camera. The camera may then record a set of video frames, from which one or more 1-D feature values are extracted and supplied as inputs to a motion classifier. If the classifier determines that the detected motion is irrelevant or otherwise non-relevant, the device may suppress the performance of a motion-triggered action, such as storing video or sending a user notification. Alternatively, if the classifier determines that the detected motion is relevant, the device may perform the motion-triggered action. Beneficially, the motion classifier may reduce the number of false positive motion event detections, which may in turn reduce the occurrence of irrelevant notifications, unnecessary video recording and/or uploading, and/or reduce the amount of power consumed by motion-triggered actions (potentially leading to improved battery life for battery-powered devices).

As described herein, "irrelevant motion" may refer to changes in pixel values across frames that are representative of repetitive, oscillating, or periodic motion. Irrelevant motion may refer to visual changes in a video that causes a change in the intensity of pixel values across frames without any substantial physical change or translation in an object's location, other than back- and forth or up-and-down movement that is characteristic of tree branches swaying in the breeze, for example. In some embodiments, the term "irrelevant motion" may encompass all motion that is unlikely to be of interest to a user, which could include some non-repeating motion such as motion of vehicles or animals, or movement of objects in the background of a camera's field-of-view. The manner in which a frame, set of frames, or video is determined to represent irrelevant motion, as compared to relevant or "real" motion, depends upon the training, tuning, and validation of the motion classifier. In some cases, phenomena in the camera's field-of-view that cause changes in pixel intensity values across frames, yet do not include a change in an object's location, may be considered irrelevant (e.g., motion from a television screen or an irregularly flickering lightbulb).

As described herein, "relevant motion" may refer to changes in pixel values across frames that are representative of the movement of a human or some other object from one location to a different location within or across a camera's field-of-view (e.g., including a human or object entering and/or leaving the camera's field-of-view). Relevant motion may refer to visual changes in the camera's field-of-view that cause changes in the intensity of the pixel values across frames based on a substantial physical change or translation in a person's location or an object's location. In some embodiments, the term "relevant motion" may encompass all motion relevant to the performance of a motion-based action, which could include some irrelevant motion (e.g., periodic movement by a human being, such as back-and-forth pacing or hand waving). The manner in which a frame, set of frames, or video is determined to represent relevant motion, as compared to irrelevant motion, depends upon the training, tuning, and validation of the motion classifier. In some cases, movement of an object across a frame may not be considered relevant motion (e.g., a car driving by in the background of the frame, clouds moving across the sky, etc.).

Due to differences in problems to be solved in different contexts, some irrelevant motion may be considered relevant while some non-irrelevant motion may be considered irrelevant. As a result, it will be appreciated that the term "irrelevant" motion generally encompasses types of motion that are non-relevant to the performance of a particular action. Conversely, it will also be appreciated that the term "relevant" motion generally encompasses types of motion that are relevant to the performance of a particular action. One of ordinary skill will appreciate that the defining boundary between different classifications may vary depending on the volume of training data, the quality of that training data, the labels ascribed to each sample in the training data, and the hyperparameters of the classifier, among various other implementation-specific details.

As described herein, "downsampling" generally refers to the process of generating a reduced-quality version of an input source of data. As a specific example, a 24-bit color image or video frame may be downsampled to an 8-bit grayscale representation of the input color image or video frame. As another specific example, a 2-Megapixel image or video frame (e.g., 1600 pixels by 1200 pixels) may be downsampled to a reduced resolution (e.g., 100 pixels by 100 pixels). As yet another example, an original quality image may be encoded in a particular color space (e.g., RGB), which may be downsampled to a different color space (e.g., YCbCr). As another example, an input video may be downsampled using a video encoder that compresses the input video (e.g., by changing the color space, resolution, and/or other aspects of the input video) to generate a reduced-quality video having a reduced bitrate relative to the input video. One or more frames may be extracted from the reduced-quality video and used to carry out aspects of the present methods, such as generating motion frames and/or computing feature values. Other aspects of an image or video frame may also be modulated, compressed, or otherwise reduced in quality.

As described herein, a "motion frame" may be any information or data extracted, generated, or otherwise determined based on two or more input frames that represents a change across the two or more input frames. As one specific example, a motion frame may be generated by calculating a pixel-by-pixel absolute difference, such that corresponding pixels across two frames that do not change would have a value at or near zero, while corresponding pixels across two frames that change substantially would have a value well above zero (see Equation 1 below). In other examples, the motion frame may be generated based on optical flow (including phase correlation, differential methods such as the Lucas Kanade or Horn-Schunck methods, etc.) and/or background subtraction (including a temporal average filter, a mean filter, frame differencing, a running Gaussian average, Fuzzy background subtraction, and/or other foreground and/or background detection methods) techniques. In yet other examples, a motion frame may be extracted from an encoded video that compresses the video data by storing changes in corresponding pixels across frames (e.g., P-frames, B-frames, delta frames, etc.). In some cases, the term "motion frame" may refer to a feature that represents a change, movement, or other difference between two or more frames, which may be generated using any suitable mathematical or computational operation. In some embodiments, the motion frame may contain spatial information (e.g., be a 2-D matrix of values), from which other feature values can be extracted or computed (e.g., mean, standard deviation, skewness, kurtosis, discrete cosine transform, etc.). A motion frame may more generally be considered a "difference frame," in that the motion frame comprises pixels that each quantify a difference between respective pixels across two frames.

As described herein, the term "one-dimensional feature" generally refers to a scalar feature value that can be extracted from a data sample. A 1-D feature may be a statistical value (e.g., mean (arithmetic or geometric), variance, standard deviation, skewness, kurtosis, correlation, etc.) or a linear or frequency transformation coefficient (e.g., a coefficient of the discrete cosine transform (DCT), discrete Fourier transform (DFT), fast fourier transform (FFT), etc.). A 1-D feature value may refer to a scalar value in one dimension (as opposed to a multi-dimensional variable or vector comprising multiple values).

As described herein, the term "statistical similarity feature value" may generally refer to any feature value that represents a statistical quantification of input data, such as video frames, reduced-quality frames, and/or motion frames, among other possible types of input data. The mean, variance, standard deviation, skewness, kurtosis, and correlation coefficient may each be considered a statistical similarity feature value, and may provide a quantitative representation of a statistical quality of input data. For example, the mean value of a motion frame's pixel values may generally indicate the extent to which a pair of frames based upon which the motion frame was generated depicts motion (e.g., with a high mean value indicating a substantial amount of change across frames, and a low mean value indicating a substantial amount of similarity across frames). In some embodiments, a statistical similarity feature value is a 1-D or scalar value that quantifies some quality of the input data.

As described herein, the term "classifier" generally refers to a machine learning tool, model, or combination thereof configured to predict a class or category of a data sample based on one or more feature values extracted from that data sample. A classifier may be constructed from a multi-layer perceptron (MLP) network, artificial neural networks (ANN), support vector machines (SVM), a Bayesian network, a decision tree, and/or any other suitable model or network configured to perform classification. A classifier may, in some instances, predict the most likely class or category with which a particular data sample is most closely related. Alternatively, or additionally, a classifier may determine the likelihood that a given data sample falls into one or more classes or categories. Regardless of the particular classifier, it will be appreciated that a variety of statistical models and/or machine learning tools may be used to implement a motion classifier.

The remaining detailed description describes the present embodiments with reference to the drawings. In the drawings, reference numbers label elements of the present embodiments. These reference numbers are reproduced below in connection with the discussion of the corresponding drawing features.

FIGS. 1A and 1B are schematic diagrams illustrating example processes for classifying motion from recorded video frames, according to various aspects of the present disclosure. In FIG. 1A, a camera 110 records video frames 102 of a scene, which depicts a tree swaying back and forth in the wind (with the motion of the tree being illustrated in FIG. 1A using dashed lines). The camera 110, a processor, and/or other computing device may then generate modified frames 103, which may include downsampled versions of the video frames 102 and/or motion frames as described herein. A feature extractor 130 then extracts, based on the modified frames 103, 1-D feature values, which may be generally representative of spatial consistency, frame consistency, motion consistency, the magnitude of change across frames, and/or the spread of change across frames, among other possible representations. The feature extractor 130 may also temporarily store the 1-D feature values in a buffer, so that the 1-D feature values may be tracked over a period of time (e.g., to generate a spline or waveform of the 1-D feature values across a predetermined number of frames).

Each of the 1-D feature values—either individual feature values, or a set of 1-D features over time—may then be provided as input into a classifier 140 to predict, categorize, and/or otherwise determine the type of motion represented in the video frames 102. The classifier 140 may be a pre-trained model, network, or other type of machine learning-based classification tool that has been trained to distinguish between at least two categories of motion. In this example, the classifier 140 has been trained to discern irrelevant motion from relevant motion. In the example of FIG. 1A, the video frames 102 represent a scene in which a tree is swaying in the wind. As a result, the classifier 140 generates an output 104 indicating that the motion present in the frames 102 is irrelevant motion.

In the example according to FIG. 1B, the camera 110 records video frames 106 of a scene, in which a human is walking toward the camera 110 (with the motion of the human being illustrated in FIG. 1B using dashed lines). Similar to the process described with respect to FIG. 1A, the camera 110, a processor, and/or other computing device may then generate modified frames 107, which may include downsampled versions of the video frames 106 and/or motion frames. The feature extractor 130 may then extract one or more 1-D feature values from the modified frames 107, and in some implementations may temporarily store the 1-D feature values in a buffer such that the changes in those 1-D feature values may be determined or evaluated across frames. The 1-D feature values are then provided as inputs into the classifier 140, which in turn generates an output 108 indicating that the motion present in the video frames 106 is relevant motion.

Some examples of irrelevant motion may include motion from objects in the environment caused by wind, such as tree leaves or branches, flags, spider webs, and/or other objects. "Motion" may be observed due to changes in lighting conditions, such as "moving" shadows caused by moving or swaying objects. Blinking or flickering lights may, in some instances, be labeled as irrelevant motion in training the classifier 140. Similarly, "motion" detected from television screens or computer monitors may be considered in-place, irrelevant motion. Some types of weather or precipitation, such as snow and rain, might be considered as irrelevant motion as well. Depending upon the particular implementation, periodic or in-place movement by a human or animal may fall into the category of irrelevant motion.

Some examples of relevant motion may include movement by an animal or human moving from one location to another location in a scene (e.g., translation or displacement, rather than in-place movement). Objects that approach the camera (human or otherwise) may also fall into the category of relevant motion. Depending upon the hyperparameter configuration of the classifier 140 and the 1-D feature values serving as inputs thereto, the classifier 140 may be able to discern between different types of in-place human motion (e.g., someone standing in place looking down at a smartphone, compared to someone performing an aggressive act such as jumping up and down).

Generating the motion frames as described herein may involve one or more computational steps, the output of which is a two-dimensional (2-D) representation of a comparison between two video frames (or downsampled frames), such as optical flow estimations (e.g., phase correlation or other differential method based on partial derivatives), background subtraction, or an absolute pixel-by-pixel difference between a pair of frames. Motion frames may be generated from sequentially-adjacent frames, or from a pair of frames separated by a predetermined number of intermediate frames. Equation (1) describes one example calculation for a given motion frame, where represents the predetermined number of intermediate frames (e.g., a value between 1 and 32, although other values are also possible).

$$\text{MotionFrame}[k] = \text{abs}(\text{Frame}[k] - \text{Frame}[k-\beta]) \quad (1)$$

Calculating the mean pixel value of a motion frame may involve summing up each pixel value (e.g., for grayscale frames, a single scalar value per pixel) and dividing by the total number of pixels in the frame. The standard deviation of the pixel values of a motion frame may be calculated using a well-known standard deviation formula, or using a pre-built standard deviation function in a software library.

Determining a 1-D DCT feature value may involve calculating one of the coefficients for the DCT (e.g., the [0,0] coefficient of DCT-II, although other coefficients may also be used). The DCT is a two-dimensional transform that is approximately equivalent to a 1-D DCT performed along a single dimension, followed by a 1-D DCT in an orthogonal dimension. Equations (2)-(4) generally describe a DCT formula for an input frame A, where M and N are the row and column size of frame A, respectively.

$$B_{pq} = \alpha_p \alpha_q \sum_{m=0}^{M-1} \sum_{n=0}^{N-1} A_{mn} \cos\left(\frac{\pi(2m+1)p}{2M}\right) \cos\left(\frac{\pi(2n+1)q}{2N}\right) \quad (2)$$

$$\alpha_p = \begin{cases} \frac{1}{\sqrt{M}}, & p = 0 \\ \sqrt{\frac{2}{M}}, & 1 \leq p \leq M-1 \end{cases} \quad (3)$$

$$\alpha_q = \begin{cases} \frac{1}{\sqrt{N}}, & q = 0 \\ \sqrt{\frac{2}{N}}, & 1 \leq q \leq N-1 \end{cases} \quad (4)$$

Estimating the spatial or frame consistency may involve calculating a 2-D correlation coefficient between two frames (or downsampled frames). Equation (5) describes one example calculation for a given 2-D correlation coefficient (also described herein as a "spatial correlation value" representing the spatial consistency across two frames), where β represents the predetermined number of intermediate frames between the two frames (e.g., a value between 1 and 32, although other values are also possible). In Equation (5), $\overline{A}$ refers to a mean value of A, and $\overline{B}$ refers to a mean value of B.

$$r = \frac{\sum_{m}\sum_{n}(A_{mn} - \overline{A})(B_{mn} - \overline{B})}{\sqrt{\left(\sum_{m}\sum_{n}(A_{mn} - \overline{A})^2\right)\left(\sum_{m}\sum_{n}(B_{mn} - \overline{B})^2\right)}} \quad (5)$$

Each of the above-described 1-D feature values may be stored in a buffer, such that the change in each 1-D feature value can be calculated across a set of frames. Some characteristics of a 1-D feature's waveform or spline may be indicative of a particular type of motion. For example, the mean pixel value of a set of motion frames may oscillate (e.g., exhibit a substantially high frequency, such as a frequency above a threshold value, or the magnitude of a frequency component (of a DFT or FFT) exceeding a threshold magnitude), which might be indicative of irrelevant motion. Conversely, the mean pixel value of a set of motion frames may exhibit a large peak or dip (e.g., have a substantially low frequency or insubstantial oscillation), which may be indicative of relevant motion. The boundary delineating irrelevant from relevant motion may vary, depending upon the particular implementation.

Similarly, the waveform or spline of the standard deviation of the pixel values of the motion frame and/or of the 2-D correlation coefficient may exhibit characteristics indicative of a particular type of motion. In general, the instantaneous standard deviation or 2-D correlation coefficient value approaching its running average may be indicative of irrelevant motion, whereas substantial shifts away from the running average might represent relevant motion. The implementation of a classifier that predicts whether motion is irrelevant or relevant may involve supervised machine learning training, or may be coherently programmed by an expert based on the observations described above.

The motion classification techniques described herein may be tuned in a variety of ways by, for example, adjusting one or more hyperparameters of the classifier and/or algorithm. For example, the distance between frames (e.g., for generating motion frames and the 2-D correlation coefficient) may be adjusted. As another example, the window size of the waveform or spline that is analyzed may be increased or decreased, which may in turn affect the duration of time involved in performing the classification and/or the accuracy of the motion classification. As yet another example, the downsampled quality of the frames may be adjusted, which might affect the accuracy of the classification and/or the computing time involved in performing feature extraction and classification. The motion classification techniques of the present application may be adjusted in other ways as well.

FIG. 2 is a functional block diagram illustrating a system 200 for communicating in a network according to various aspects of the present disclosure. Home automation, or smart home, is building automation for the home. Home automation enables users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively referred to herein as "A/V devices 210" or "A/V device 210") (which may represent, and/or be similar to, the device performing the process illustrated of FIGS. 1A and 1B). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a hub device 202 connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (which may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control its own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
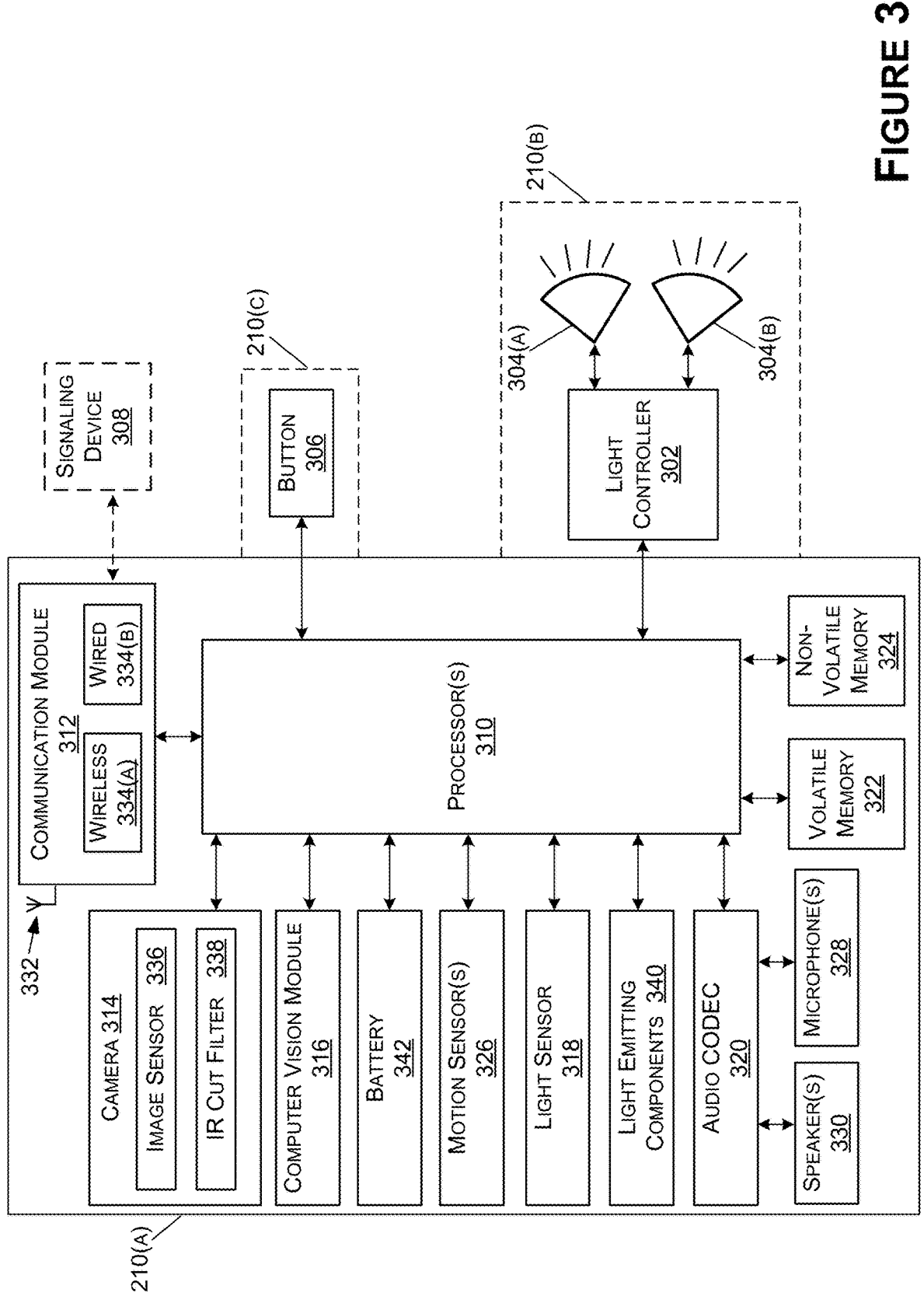
FIG. 3 is a functional block diagram illustrating one example embodiment of an A/V recording and communication device, according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, including the client devices 214, 216, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306

(in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 720p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SDRAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data recorded by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be recorded by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternatively separate from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition.

Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to ensure that it satisfies certain assumptions implied by the method. Examples of pre-processing include, but are not limited to re-sampling in order to ensure that the image coordinate system is correct, noise reduction in order to ensure that sensor noise does not introduce false information, contrast enhancement to ensure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many core DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and to enable face detection and recognition.

Another emerging trend uses the visual details of the skin, as recorded in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more components of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
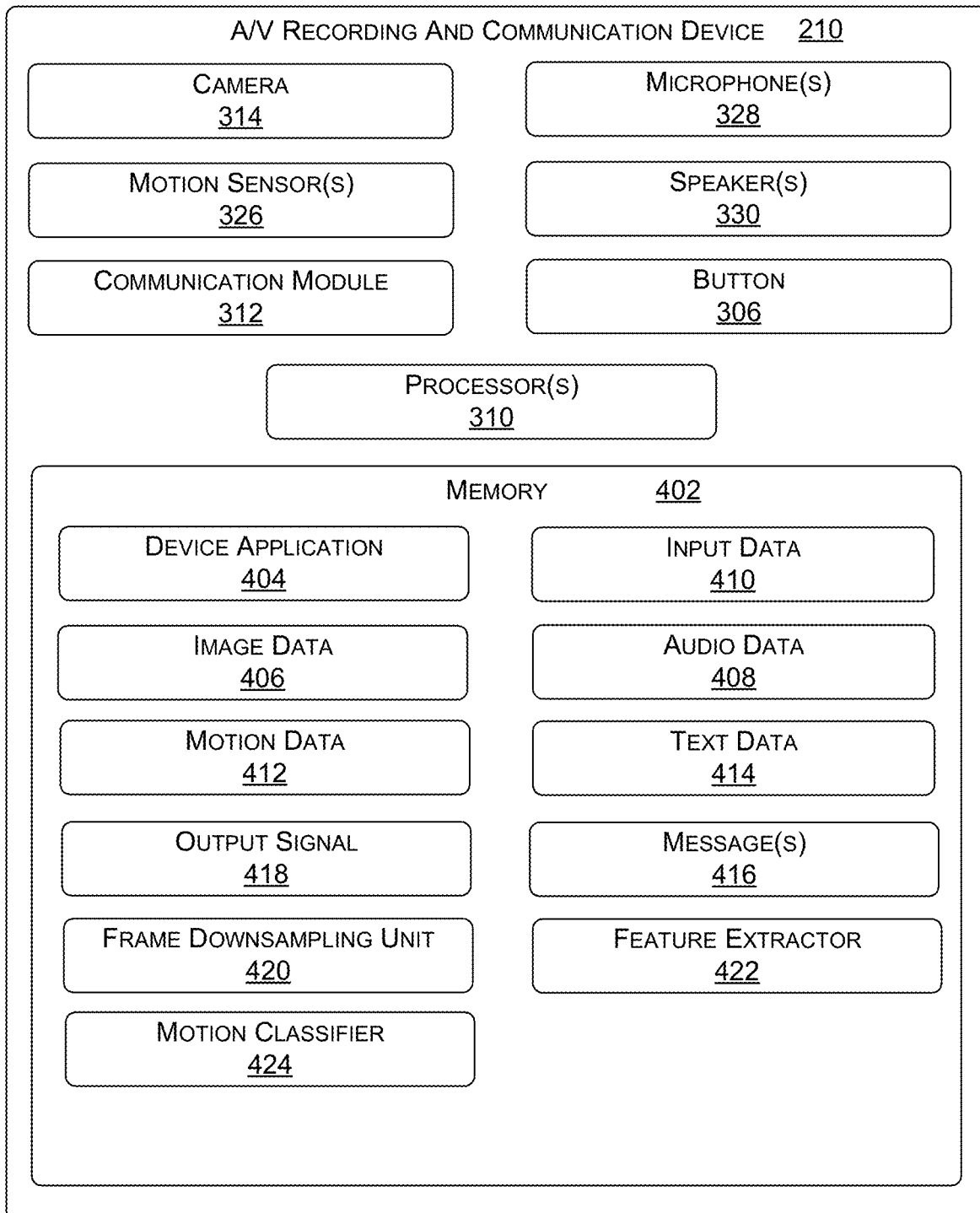
FIG. 4 is a functional block diagram illustrating another example embodiment of an A/V recording and communication device, according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to record image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 314. In some embodiments, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device.

The image data 406, the audio data 408, the text data 414, and/or the motion data 412 may be tagged (e.g., with a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210. For example, the A/V device 210 may include a frame downsampling unit 420, a feature extractor 422, and a motion classifier 424. The frame downsampling unit 420 may perform operations to reduce the color space, resolution, and/or other aspects of a video or video frames. For example, the frame downsampling unit 420 may receive color frames (e.g., 24-bit RGB color pixel values) and convert those frames to grayscale values (e.g., 8-bit, 10-bit, or 16-bit grayscale pixel values, or any other number of bits-per-pixel). The frame downsampling unit 420 may also reduce the resolution of a frame from its original resolution to a low-resolution representation of the original resolution frame (e.g., from a recorded resolution to 100 pixels by 100 pixels, 50 pixels by 50 pixels, or any other resolution). In some implementations, the A/V device 210 may include a camera or other imager that generates sufficiently low-quality images such that the frame downsampling unit 420 may not be used or included with the A/V device 210.

The feature extractor 422 may be similar to or the same as the feature extractor 130 described above with respect to FIGS. 1A and 1B. The feature extractor 422 may incorporate a combination of software and/or hardware to facilitate the calculation or extraction of one or more 1-D feature values as described herein. In addition, the feature extractor 422 may include a buffer or buffers to store the 1-D feature values across a set of frames.

The motion classifier 424 may be similar to or the same as the classifier 140 described above with respect to FIGS. 1A and 1B. The motion classifier 424 may be a pre-trained classifier configured to executed by the processor(s) 310 of the A/V device 210. Depending upon the particular implementation, aspects of the motion classifier 424 may be specifically tuned or otherwise configured for execution by the processor(s) 310 (which themselves may be inexpensive, mobile processors designed for low-power devices).

As a specific example, the downsampling unit 420 may be configured to downsample video frames recorded by camera 314 to generate adequately low-quality frames, from which 1-D features can be extracted by the feature extractor 422 in real time or substantially near-real time, to reduce the possibility of delay in performing motion classification. In addition, the "window" or buffer size (e.g., the number of data points for the 1-D feature values) considered by the motion classifier 424 may be configured such that the motion classifier 424 can perform motion classification in substantially near-real time. The window or buffer size may also be selected based on an acceptable "warm up" time (e.g., the number of frames that are recorded and analyzed before classifying the motion). Depending on the application, it may be desirable to configure the motion classifier 424 to determine whether motion is irrelevant or relevant in a short period of time (e.g., determining whether to prompt a user approaching a home assistant device, so that the user does not experience excessive delay). In contrast, it may be desirable to configure the motion classifier 424 to prioritize accurately determining whether motion is irrelevant, relevant, or some other type of motion over performing the classification quickly (e.g., labeling noteworthy events recorded by a security camera over some period of time).

Figure 5:
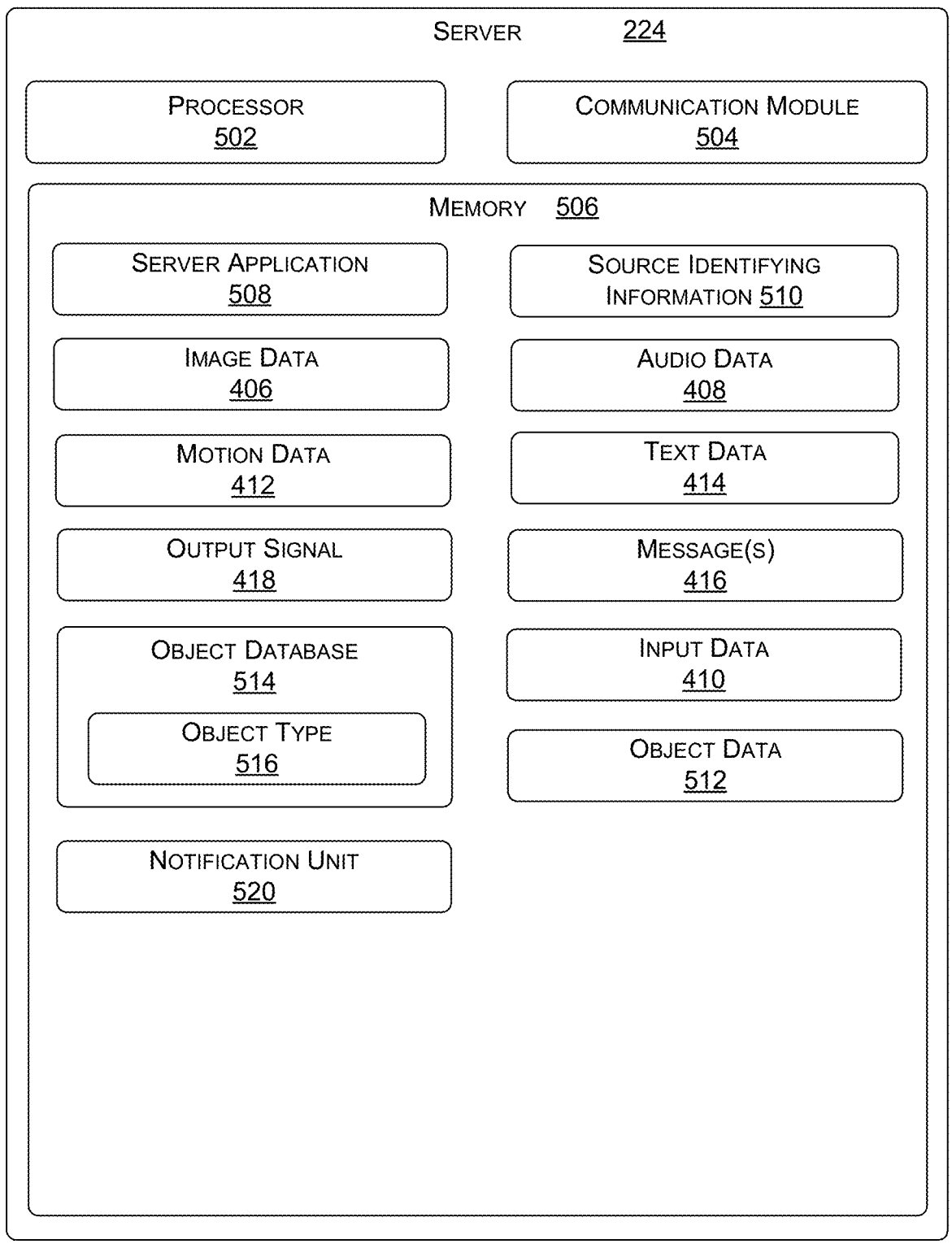
FIG. 5 is a functional block diagram illustrating one example embodiment of a backend device, according to various aspects of the present disclosure.

FIG. 5 is a functional block diagram illustrating one embodiment of the backend server 224 according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, and/or the text data 414.

As described herein, at least some of the processes of the A/V device 210, the hub device 202, and/or the client device 214, 216 may be executed by the backend server 224.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparison, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively separate from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

The backend server 224 may also include a notification unit 520. The notification unit 520 may include any combination of hardware and/or software operable to generate notifications directed through client device applications, emails, and/or other messaging channels. The notification unit 520 may be configured to receive video frame labels, such as "irrelevant motion," "relevant motion," "real motion," "human motion," "animal motion," "vehicle motion," and/or any other type of label. The notification unit 520 may determine, based on the receive video frame label, whether or not to transmit a notification and, if so, the type of notification to transmit based on the video frame label. As a specific example, the notification unit 520 may be configured to suppress the transmission of a push notification to a user's client device related to detected motion near a user's front door if an A/V recording and communication device determines that the motion is irrelevant. Conversely, the notification unit 520 may be configured to transmit a push notification to a user's client device related to detected motion near the user's front door if the A/V recording and communication device determines that motion is "relevant motion," "real motion," or "human motion," which may be relevant to the security interests of the user. Other configurations are also possible.

In some implementations, the operation of the notification unit 520 may depend upon user-specific configurations. For example, one user may wish to be notified of various non-human activities detected by a home security camera (e.g., racoons rummaging through a user's garbage or recycling) in addition to human motion. However, another user may wish to only be notified when human motion is detected, and not notified based on other non-human movement. In these different examples, a device may perform the step of classifying video frames or groups of video frames into one or more categories of motion, and may then transmit those motion labels to the backend server 224. The backend server 224 may then either perform or suppress the performance of an action, such as transmitting a notification to a user, based on the extent to which the received video frame motion labels satisfy the user's preferences or stored configuration (e.g., if detected motion is from an animal, and the user has elected not to receive notifications of animal motion, then suppress or do not transmit any notification).

Although described as being performed in the backend server 224, in some embodiments, the image data 406 may be analyzed by any of the A/V recording and communication device 210, the hub device 202, and/or the client device 214, 216 in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 512, as described with reference to FIG. 5.

The hub device 202 and/or the backend server 224 (and/or one or more additional or alternative components of the network(s) of servers/backend devices 220) may alternatively be referred to herein as "network devices."

Figure 6:
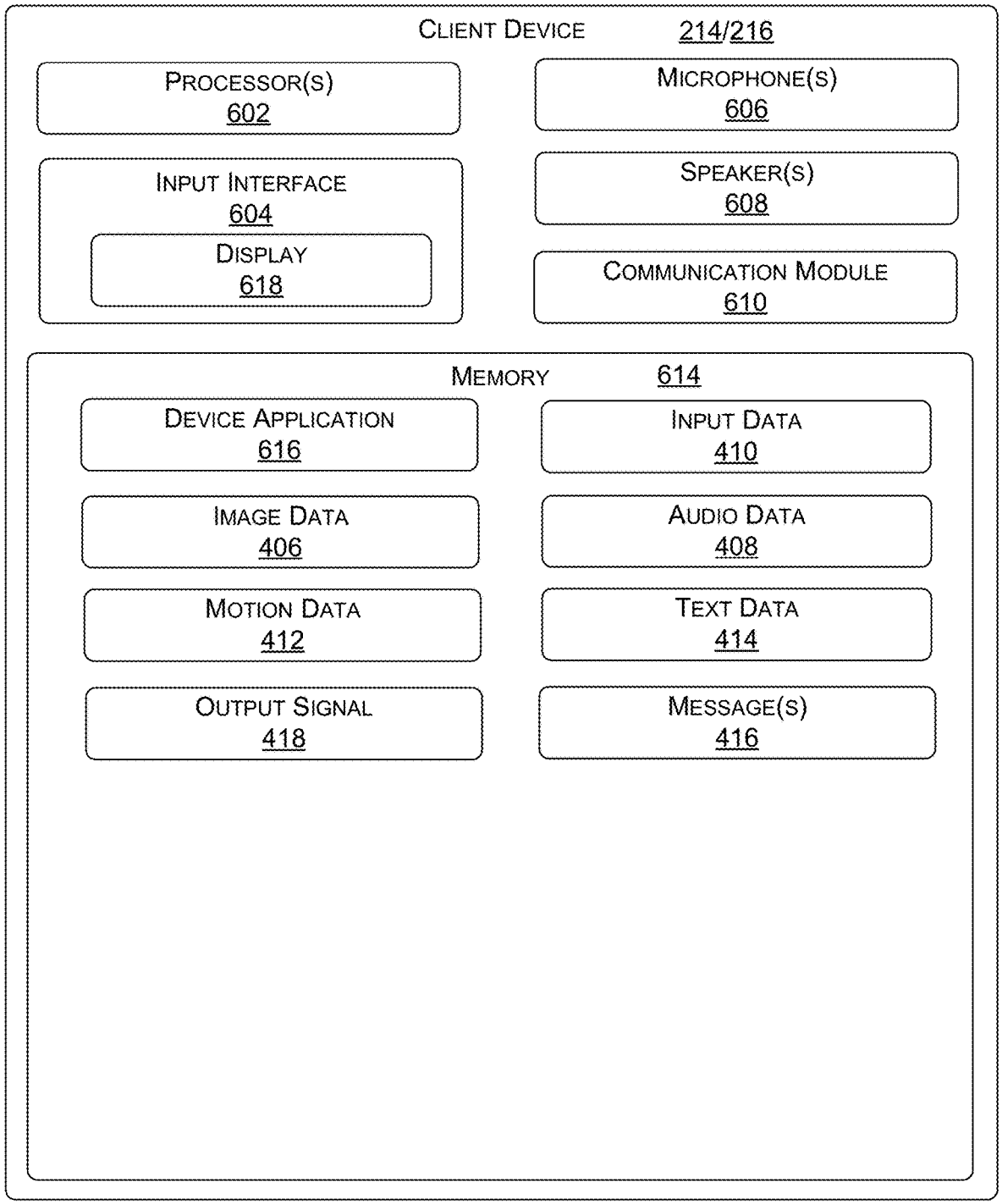
FIG. 6 is a functional block diagram illustrating one example embodiment of a client device, according to various aspects of the present disclosure.

FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 614 may store a device application 616. In various embodiments, the device application 616 may configure the processor(s) 602 to receive input(s) to the input interface 604. In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618. In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 616 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 616 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

Each of the processes described herein, including the processes 700, 800, 900, 1000, and 1100 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 7:
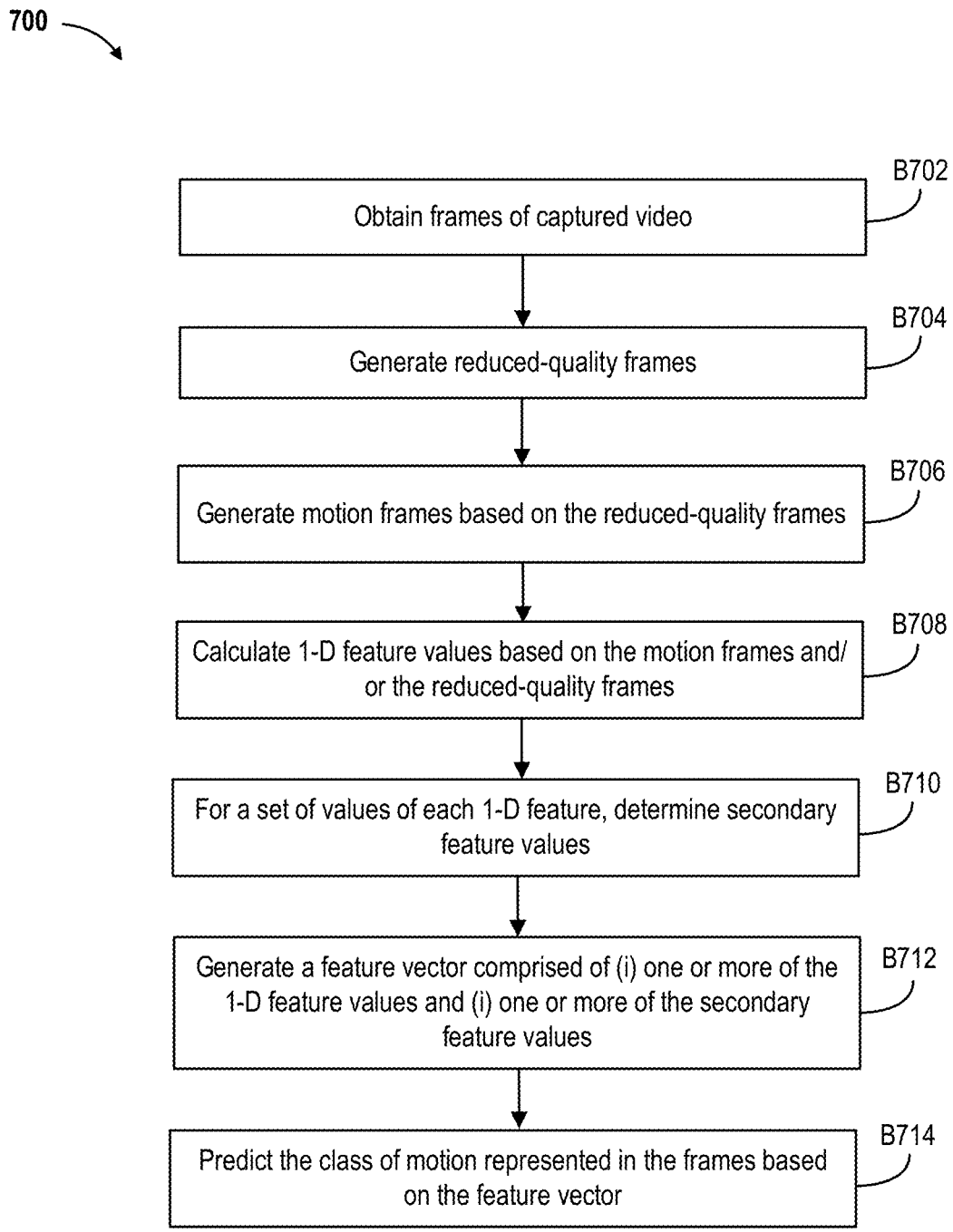
FIG. 7 is a flowchart illustrating an example process for classifying motion in recorded video, according to various aspects of the present disclosure.

FIG. 7 is a flowchart illustrating an example process 700 for classifying motion in recorded video, according to various aspects of the present disclosure. The process 700, at block B702, obtains frames from recorded video. For example, the camera 314 of the A/V device 210 may record video over a period of time, which is comprised of a plurality of frames. The video frames may be recorded at an original level of quality, which may in some embodiments be down-sampled to reduce the color space and/or resolution of the video frames. Depending upon the particular implementation, the frames may each represent an image independently (I-frames), or may represent differences between one or more adjacent frames (e.g., compressed frames such as P-frames or B-frames).

The process 700, at block B704, generates reduced-quality frames based on the original-quality frames recorded at block B702. For example, the processor(s) of 310 may perform one or more operations (e.g., based on programs stored in device application 404 and/or in the frame down-sampling unit 420) in order to reduce the color space and/or resolution of the original-quality frames. In some implementations, the color space may be reduced to a grayscale color space, and the resolution may be reduced to a particular resolution that is less than the resolution of the originally-recorded video frames. The number of bits per-pixel and the resolution of the reduced-quality frames may be configurable hyperparameters of the classification techniques described herein.

The process 700, at block B706, generates motion frames based on the reduced-quality frames (or the original-quality frames, depending on the specific implementation). For example, the processor(s) 310 of the A/V device 210 may perform computations or calculations, such as pixel-by-pixel subtraction between a pair of frames, to generate the motion frames. In some embodiments, the motion frames may be determined, extracted, or otherwise obtained based on the nature of the compression of the recorded video (e.g., where the video compression is based on differences in frame values). Other types of motion frame computations, such as optical flow and background subtraction, may also be performed to generate the motion frames.

The process 700, at block B708, calculates 1-D feature values based on the motion frames and/or the reduced-quality frames. Each 1-D feature value may be any 1-D representation of an individual frame, a pair of frames, a set of frames, and/or a motion frame, such as a statistical value or linear transformation coefficient, as described above. Multiple values of a given 1-D feature, such as the standard deviation of the pixel values of a motion frame, may be stored in a buffer to represent a histogram, waveform, or spline of the 1-D feature value across a set of frames.

The process 700, at block B710, determines "secondary" feature values based on the histogram, waveform, or spline of one or more 1-D feature values. Secondary feature values may be 1-D or low-dimensional features determined based on characteristics of a 1-D feature's value over a window of time. As a result, secondary feature values may quantify the temporal aspects of a 1-D feature. As a specific example, the mean (or running mean) of the 2-D correlation coefficient may be determined over a 30-frame window. As another example, one or more coefficients of a best-fit polynomial may be determined that approximates the waveform of the standard deviation of the pixel values of the motion frames over a 30-frame window. In addition, a difference between the area under the best-fit polynomial (e.g., an integral) and an approximate area under the standard deviation of the pixel values of the motion frames (e.g., a Riemann sum) may be determined to measure an error rate with respect to the best-fit polynomial. As a further example, a 1-D DCT coefficient of the mean pixel value of the motion frames may be calculated. Regardless of the particular secondary feature or features being calculated, embodiments of the present disclosure may involve extracting secondary feature values based on the primary 1-D feature values.

The process 700, at block B712, generates a feature vector that includes one or more 1-D feature values and one or more secondary feature values. For example, the feature vector may include one value for each of the 1-D features corresponding to a particular frame k (e.g., the mean pixel value of the motion frame k, the standard deviation of the pixel values of the motion frame k, a DCT coefficient at [0,0] of the motion frame k, and the 2-D correlation coefficient between frame k and a prior frame k–β). In addition, the feature vector may include one or more secondary feature values representing characteristics of the 1-D feature value splines, such as the mean, running mean, variance, one or more best-fit polynomial coefficients, best-fit polynomial error rate, a 1-D DCT coefficient of the spline, and/or any other possible secondary feature. In some implementations, the feature vector may be associated with a particular frame k, representing its 1-D feature values and characteristics of the change in those 1-D feature values over some window or buffer preceding frame k.

The process 700, at block B714, involves predicting the class of motion based on the feature vector generated at block B712. For example, the motion classifier 424 of the A/V device 210 may include a statistical classifier, MLP, or other classifier that receives the feature vector as an input. In implementations where the feature vector corresponds with a single frame k, the motion classifier 424 may predict the class of motion on a per-frame basis. In other implementations, the feature vector may correspond with a set of frames, with the motion classifier 424 being configured to predict the class of motion represented in that set of frames. The motion classifier 424 may be pre-trained based on labeled training data, and/or trained using unsupervised learning techniques.

Figure 8:
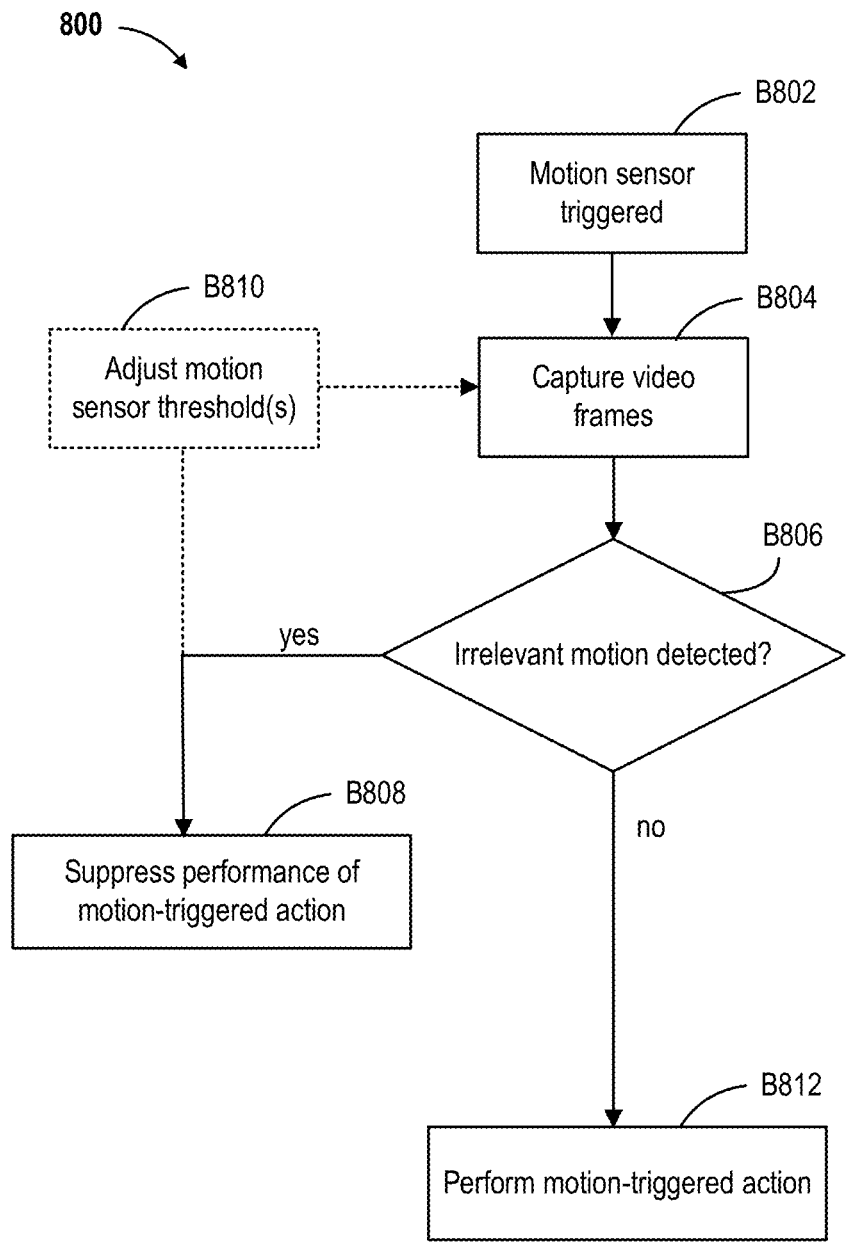
FIG. 8 is a flowchart illustrating an example process of an example application of motion classification on a device, according to various aspects of the present disclosure.

FIG. 8 is a flowchart illustrating an example process 800 of an example application of motion classification on a device, according to various aspects of the present disclosure. The process 800, at block B802, determines that a motion sensor has been triggered. For example, the motion sensor(s) 326 of the A/V device 210, such as PIR sensor(s) or other types of motion detectors, may detect motion based on an input exceeding a threshold (e.g., a change in the differential of infrared light across an entire sensor that exceeds some threshold value or voltage). The process 800, at block B802, records video frames. For example, the camera 314 of the A/V device 210 may record video continuously or semi-continuously, which may be temporarily stored in the memory 402 of the A/V device 210. Alternatively, the A/V device 210 may begin capturing video frames responsive to the detection of motion by the motion sensor(s) 326 of the A/V device.

The process 800, at block B804, records video frames. For example, the camera 314 of the A/V device 210 may begin recording and storing video responsive to the motion sensor being triggered at step B802. Alternatively, the camera 314 of the A/V device 210 may record video continuously or semi-continuously prior to step B802, which may be temporarily stored in the memory 402 of the A/V device 210. As such, depending upon the particular implementation, block B804 may precede block B802.

The process 800, at block B806, determines whether irrelevant motion has been detected. For example, the A/V device 210 may classify the video frames recorded at block B802 using the motion classification techniques described herein. If irrelevant motion is detected, then the process 800 proceeds to block B808 and, in some cases, to block B810. Conversely, if irrelevant motion is not detected, the process 800 proceeds to block B812.

The process 800, at block B808, suppresses the performance of a motion-triggered action. For example, the A/V device 210 may be configured to overwrite a temporary buffer that stores video frames, unless relevant motion is detected (whereby a video segment representing the relevant motion may be permanently stored, uploaded to the backend server 224, etc.). As another example, the A/V device 210 may be configured to transmit to a backend server 224 a message based on the detection of relevant motion that, in turn, causes the backend server 224 to generate a notification directed to the client device 214/216. However, if the detected motion is determined to be irrelevant, the A/V device 210 may withhold from transmitting the message, or may transmit a different message to the backend server 224 indicating that the detected motion was relevant. Regardless of the particular action, the process 800 at block B808 may involve the suppression or omission of an action that would otherwise be performed in response to detected motion.

The process 800, at block B810, optionally adjusts motion sensor threshold(s) of a motion sensor or detected. For example, the motion sensor(s) 326 of the A/V device 210 may be PIR sensor(s) that have configurable threshold points that allows the sensor(s) to have adjusted sensitivity. In some embodiments, the A/V device 210 may, upon detecting irrelevant motion, adjust the sensitivity of the motion sensor(s) 326, so as to reduce the number of potentially unnecessary video frame analyses, which might otherwise unnecessarily consume battery or power. In addition, some embodiments may involve increasing the sensitivity of motion sensor(s) 326 based on the detection of relevant motion.

The process 800, at block B812, performs a motion-triggered action based on the detection of relevant. For example, the A/V device 210 may transmit a message to the backend server 224 that causes the backend server 224 to generate a notification directed to the client device 214/216. As another example, the A/V device 210 may permanently store and/or upload to the backend server 224 a video segment that contains the relevant motion. Together, the two examples above enables a user to be notified of potentially relevant activity, and able to view that activity remotely on the client device 214/216.

Figure 9:
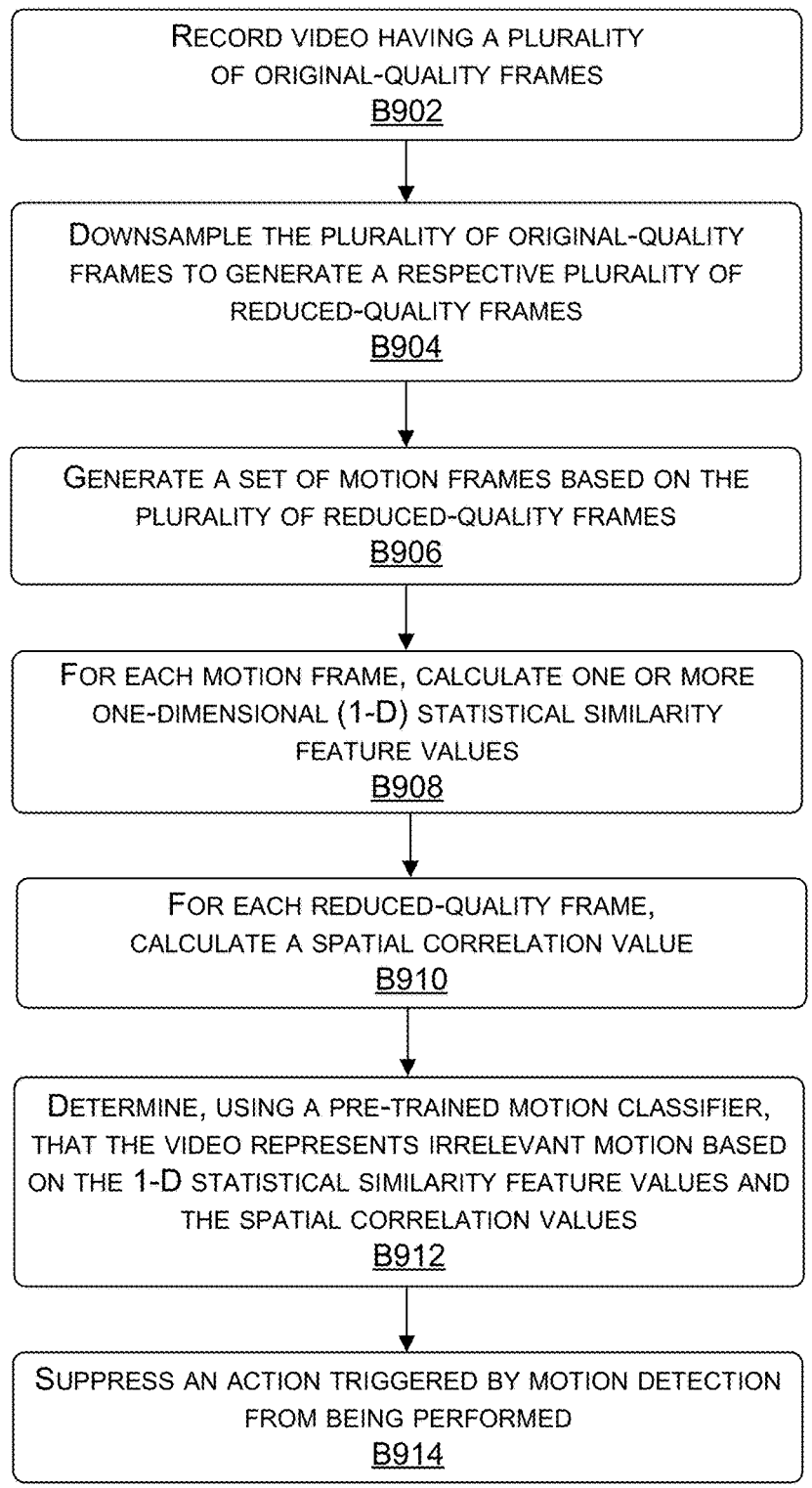
FIG. 9 is a flowchart illustrating an example process for classifying motion represented in video frames, according to various aspects of the present disclosure.

FIG. 9 is a flowchart illustrating an example process 900 for classifying motion represented in video frames, according to various aspects of the present disclosure. The process 900, at block B902, records video of a scene. The video includes a plurality of original-quality frames, which may be generated by a camera, imager, and/or processor. The video may represent the field-of-view of a camera or imager of a device, such as A/V device 210. The original-quality frames may be recorded and stores as a series of frames, or may be compressed and stored as video data. For example, the original-quality frames may have a color depth and resolution that substantially matches the output of a camera or imager.

The process 900, at block B904, downsamples the plurality of original-quality frames to obtain a respective plurality of reduced-quality frames. The reduced-quality frames may be a lower resolution and/or a reduced color space representation of the original quality frames. For example, the original-quality frames may include intensity values for red, green, and blue (RGB) light, whereas the reduced-quality frames include a single color channel or grayscale representation of the RGB pixel values. As another example, the original-quality frames may be at or near a native resolution of a camera or imager, while the reduced-quality frames may have a fixed resolution (e.g., 100 pixels by 100 pixels) that is smaller than the original-quality frame resolution. Downsampling from an original-quality frame to a reduced-quality frame may involve performing one or more computations to generate representative pixel values at a lower resolution relative to that of the original-quality frames (e.g., generating an average color or brightness level for groups of pixels, generating an image at reduced resolution using compression techniques, and/or any other suitable image scaling technique).

The process 900, at block B906, generates a set of motion frames based on the plurality of reduced-quality frames. Each motion frame may be computed, for example, based on an absolute pixel-by-pixel difference between a pair of reduced-quality frames (e.g., reduced-quality frame k and reduced-quality frame k–β). The motion frames may represent the degree of change in each pixel's brightness or intensity between a pair of frames. Other techniques, such as optical flow or background subtraction, may additionally or alternatively be used to generate the set of motion frames.

The process 900, at block B908, calculates one or more 1-D statistical similarity feature values for each motion frame. The statistical similarity values may be the same as or similar to the 1-D statistical feature values described above.

The process 900, at block B910, computes a spatial correlation value for each reduced-quality frame. The spatial correlation value may, for example, be a 2-D correlation coefficient determined based on the pixel values of a reduced-quality frame. The 2-D correlation coefficient may be a scalar, 1-D value, which may also serve as a basis for motion classification. An example technique for generating the spatial correlation value is provided above in Equation 5. The spatial correlation value may generally represent the extent of spatial consistency between frames. Depending upon the particular implementation, the spatial correlation value The process 900, at block B912, determines, using a pre-trained motion classifier, that the video represents irrelevant motion based on the 1-D statistical similarity feature values and the spatial correlation values. The motion classifier may be any type of classifier, such as an MLP, which is trained to distinguish between two or more classes of motion based on 1-D statistical similarity feature values, spatial correlation values, and/or other 1-D feature values. Any suitable training technique may be used to develop the motion classifier.

The motion classifier may include an input layer that receives a feature vector comprised of 1-D feature values and/or secondary feature values. As a specific example, for a given frame k, the feature vector may include one or more of the following: a mean value of the pixel values for motion frame k (with the motion frame k being computed based on reduced-quality frames k and k–β); a standard deviation of the pixel values for motion frame k; a 2-D correlation coefficient value between reduced-quality frames k and k–β; a DCT coefficient value at [0,0] for motion frame k; and one or more secondary feature values (e.g., DCT coefficients, best-fit polynomial coefficients, mean, standard deviation, etc.) that are computed based on a set of 1-D feature values corresponding to a respective set of frames (e.g., a 1-D feature's value for frames k–30 to k, among other possible window sizes).

The motion classifier may be trained using labeled training data that associates feature vectors with a particular class of motion. For example, training data feature vectors may be labeled as "irrelevant motion," "relevant motion," or "no motion," which may be used to train a neural network (e.g., using backpropagation). As another example, training data feature vectors may be labeled "human motion," "animal motion," or "vehicle motion," among other possible classes of motion. The manner in which data samples are selected, labeled, and used for training and/or validation purposes may vary, depending on the particular application of the motion classifier.

Regardless of the particular implementation, the motion classifier may, in response to receiving a feature vector input comprised of at least the 1-D statistical similarity feature values and the spatial correlation values, generate an output indicating a predicted class of motion represented in a frame, set of frames, or video segment. In some cases, the motion classifier may generate multiple output values, such as multiple confidence values for each class of motion that the motion classifier is designed to consider. The motion classifier may determine that irrelevant motion is represented in a frame or frames when the output associated with the irrelevant motion class has the highest confidence interval. In some embodiments, the motion classifier may determine that irrelevant motion is represented in a frame or frames when the output associated with irrelevant motion has a confidence interval that exceeds a threshold confidence interval.

The process 900, at block B914, suppresses the performance of an action that is triggered by motion detection. For example, the A/V device 210 may be configured to generate and transmit an alert to a user's client device (either directly or indirectly via the backend server 224) in response to detected motion, unless that detected motion is irrelevant or otherwise not relevant to the user. However, at block B914, the process 900 prevents the generation and/or transmission of the alert based on the determination that the detected motion was irrelevant motion.

As another example, the A/V device 210 may be configured to either begin recording video, permanently store video in a buffer, and/or transmit a video segment to the backend server 224 in response to detected motion—unless that motion is irrelevant or otherwise not relevant to the user. In an example implementation, the A/V device 210 may begin storing a video segment in a buffer that is either transmitted to the backend server 224 if the motion is relevant, or is deleted or overwritten if the motion is irrelevant. In this example, the A/V device 210 may begin storing video data in the buffer after detecting the motion. Once the process 900 determines that the detected motion is representative of irrelevant motion, the process 900 may delete or otherwise overwrite the video data in the buffer. Thus, it will be appreciated that a device may suppress the performance of an action, or may carry out a specific action based on the determination that the detected motion is irrelevant.

Figure 10:
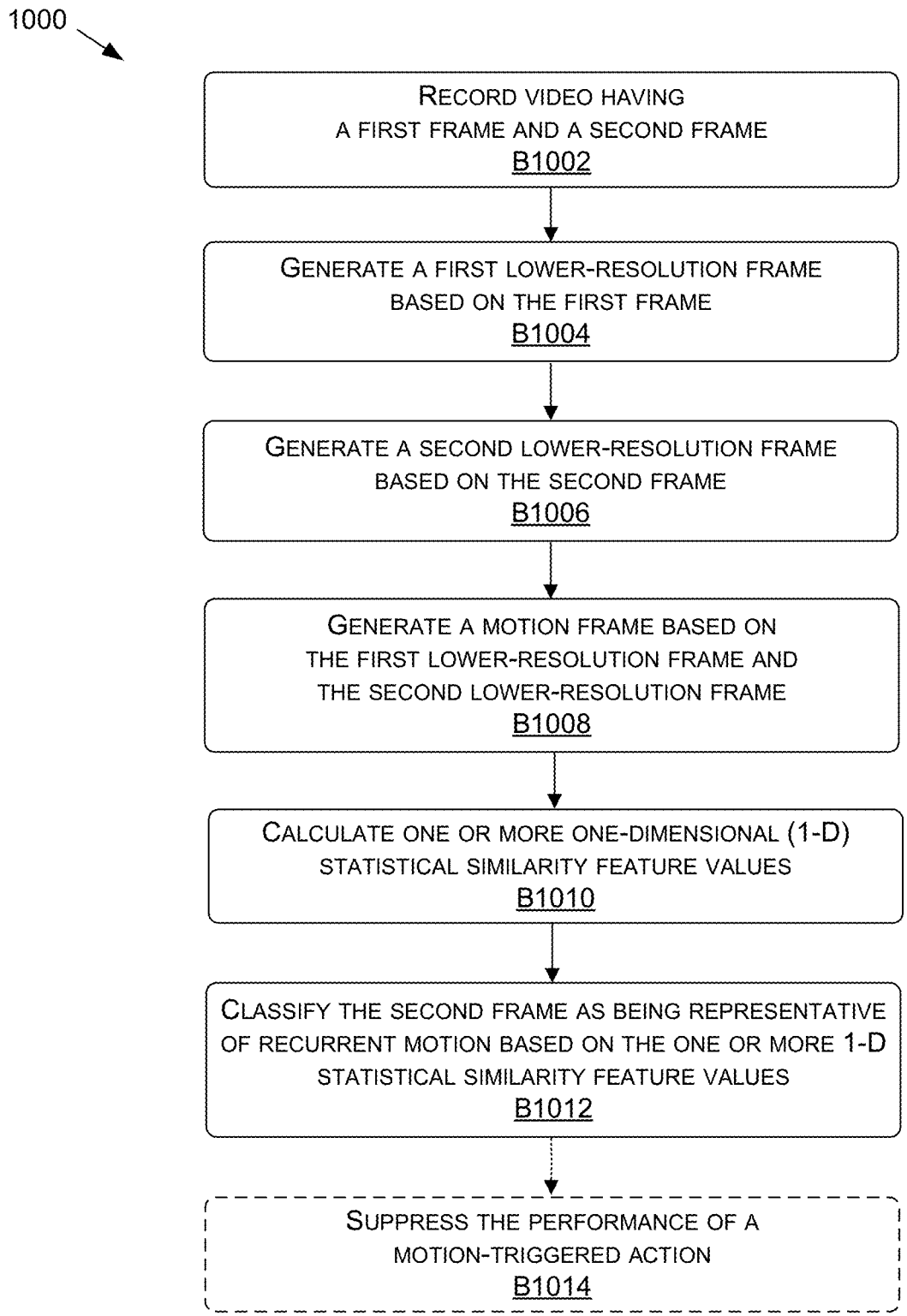
FIG. 10 is a flowchart illustrating an example process for classifying motion represented in video frames, according to various aspects of the present disclosure.

FIG. 10 is a flowchart illustrating an example process 1000 for classifying motion represented in video frames, according to various aspects of the present disclosure. The process 1000, at block B1002, records video of a scene that includes at least a first frame and a second frame. Block B1002 may be similar to block B902 described above with respect to FIG. 9.

The process 1000, at block B1004, generates a first reduced-quality frame based on the first frame. Similarly, the process 1000, at block B1006, generates a second reduced-quality frame based on the second frame. Blocks B1004 and B1006 may be similar to Block B904 described above with respect to FIG. 9.

The process 1000, at block B1008, generates a motion frame based on the first reduced-quality frame and the second reduced-quality frame. Block B1008 may be similar to block B906 described above with respect to FIG. 9.

The process 1000, at block B1010, calculates one or more 1-D statistical similarity feature values. Block B1010 may be similar to block B908 described above with respect to FIG. 9.

The process 1000, at block B1012, classifies the second frame as being representative of irrelevant motion based on the one or more 1-D statistical similarity feature values. Block B1012 may be similar to block B912 described above with respect to FIG. 9.

The process 1000, at block B1014, optionally suppresses the performance of a motion-triggered action. Block B1014 may be similar to block B914 described above with respect to FIG. 9.

Figure 11:
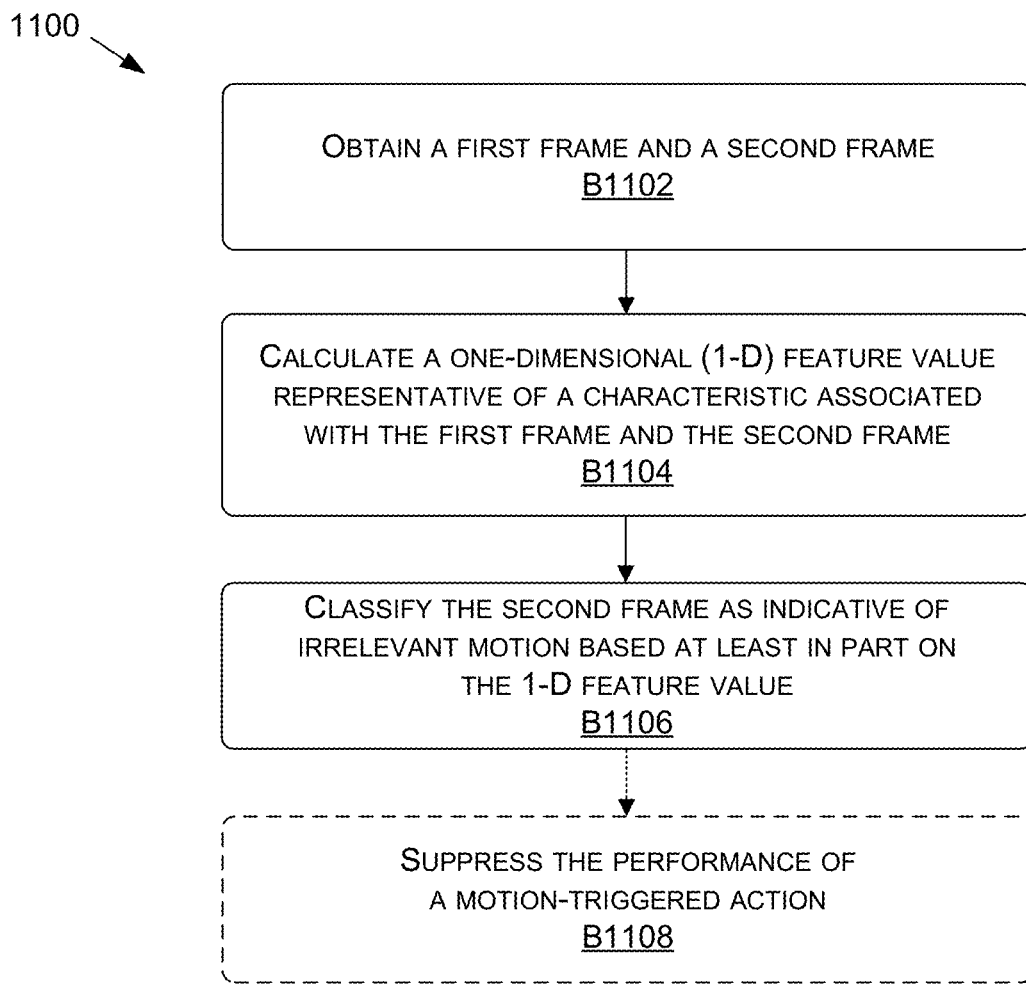
FIG. 11 is a flowchart illustrating an example process for classifying motion represented in video frames, according to various aspects of the present disclosure.

FIG. 11 is a flowchart illustrating an example process 1100 for classifying motion represented in video frames, according to various aspects of the present disclosure. The process 1100, at block B1102, obtains a first frame and a second frame that are each representative of a scene. For example, the first and second frames may be original-quality frames, reduced-quality frames, or motion frames. The frames may be obtained from a camera, imager, a storage device, and/or received as a data transmission over a network.

The process 1100, at block B1104, calculates a 1-D feature value representative of a characteristic associated with the first frame and the second frame. The 1-D feature value may be any of the 1-D feature values contemplated in the present disclosure, or any secondary feature value calculated on a series of 1-D feature values.

The process 1100, at block B1106, determines that the second frame is indicative of irrelevant motion based at least in part on the 1-D feature value. Block B1106 may be similar to Blocks B912 and B1012 described above with respect to FIGS. 9 and 10, respectively.

The process 1100, at block B1108, optionally suppresses the performance of a motion-triggered action. For example, the A/V device 210, a home assistant device, and/or any other device may not perform an action that might otherwise be performed in response to detected motion, based on the detected motion being classified as irrelevant. As another example, a backend server 224 may either perform a specific action, or not perform a motion-triggered action, based on the detected motion being classified as irrelevant.

The motion classification techniques disclosed herein may enable a low-cost device with limited computing resources to determine whether movement present within the field-of-view of the device's camera is irrelevant, relevant, or some other class of motion. The classification techniques of the present application involve the extraction and/or calculation of 1-D feature values based on video frames (or downsampled versions of video frames), which are substantially less computationally expensive to determine than more robust spatial features commonly used in many image processing and object recognition algorithms. The change in the 1-D feature values—such as statistical similarity features or linear transformation coefficients—over a window of time may provide sufficient information to enable a classifier to distinguish between multiple categories of motion, such as non-relevant or irrelevant motion and relevant or relevant motion. In classifying motion detected in video frames, the rate of false positive motion detections (e.g., detected motion not relevant to the purpose of the motion sensing) may be substantially reduced, which may in turn reduce the number of extraneous notifications provided to the user, improve the battery life of battery-powered devices, and/or enable salient events recorded in security footage to be labeled for quick access without the need for manual review of an entire video, among other possible benefits.

Figures 12A, 12B:
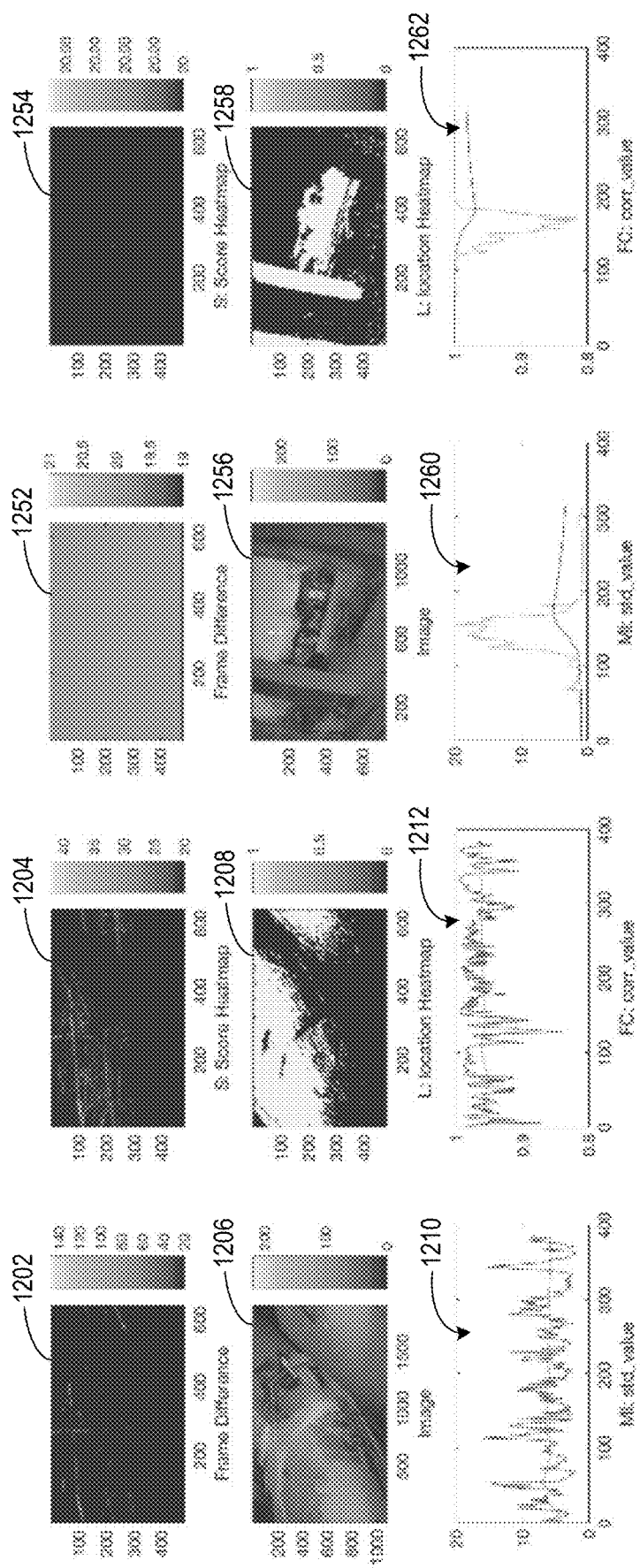
FIGS. 12A and 12B are graphical depictions of example feature values, according to various aspects of the present disclosure.

FIGS. 12A and 12B are graphical depictions of example feature values, according to various aspects of the present disclosure. The example of FIG. 12A depicts various representations of a frame that represents irrelevant motion, whereas the example of FIG. 12B depicts various representations of a frame that represents relevant motion. As shown in FIG. 12A, a downsampled, grayscale version of a video frame 1206 depicts a field-of-view recorded by a camera. The frame 1206, together with a previous frame (not shown), are then used to generate a motion frame 1202, which represents the magnitude of pixel-by-pixel differences between the pair of frames. In this example, two additional representations of motion are graphically depicted in a score heatmap 1204 and a location heatmap 1208. The location heatmap 1208 may or may not be used to detect irrelevant motion. Likewise, the score heatmap 1204 may represent an estimation of the background movement as a running average, although it may or may not be used to detect irrelevant motion.

A motion inconsistency (MI) graph 1210 graphically depicts the 1-D standard deviation value of the frame difference pixel values across approximately four-hundred different motion frames. A running average of the standard deviation feature value is also provided on the MI graph 1210. In addition, a frame consistency (FC) graph 1212 is graphically depicted in FIG. 12A, which shows the scalar 2-D correlation coefficient value between pairs of frames across approximately four-hundred different frames. As with the MI graph 1210, a running average of the 2-D correlation coefficient is shown.

Two observations can be readily made from the MI graph 1210 and the FC graph 1212 of FIG. 12A. First, both the standard deviation and correlation coefficient values possess high frequency components, and are shown to oscillate above and below the running averages of each respective variable. Additionally, the running average does not undergo a substantial level shift over the four-hundred frame period (e.g., the difference in the running average value across any two different frames does not exceed a threshold difference). The example shown in FIG. 12A illustrates that irrelevant motion may, in some cases, be identifiable based on 1-D feature values that lack any substantial spatial information.

In contrast, the example shown in FIG. 12B represents a frame that contains relevant motion. As shown in FIG. 12B, a downsampled, grayscale version of a video frame 1256 depicts a field-of-view recorded by a camera. The frame 1256, together with a previous frame (not shown), are then used to generate a motion frame 1252, which represents the magnitude of pixel-by-pixel differences between the pair of frames. As with the example shown in FIG. 12A, two additional representations of motion are graphically depicted in a score heatmap 1254 and a location heatmap 1258.

A motion inconsistency (MI) graph 1260 graphically depicts the 1-D standard deviation value of the frame difference pixel values across approximately four-hundred different motion frames. A running average of the standard deviation feature value is also provided on the MI graph 1260. In addition, a frame consistency (FC) graph 1262 is graphically depicted in FIG. 12B, which shows the scalar 2-D correlation coefficient value between pairs of frames across approximately four-hundred different frames. As with the MI graph 1260, a running average of the 2-D correlation coefficient is shown.

Two different observations can be readily made from the MI graph 1260 and the FC graph 1262 of FIG. 12B. First, both the standard deviation and correlation coefficient values exhibit a clear singular peak or dip in value (e.g., possesses a predominantly low-frequency component). Additionally, the running average undergoes a significant level shift over the four-hundred frame period. The example shown in FIG. 12B illustrates that relevant motion may, in some cases, be identifiable based on 1-D feature values that lack any substantial spatial information. Moreover, a visual comparison between the MI graphs 1210 and 1260 and FC graphs 1212 and 1262 illustrates that a classifier may be trained to distinguish between different types of motion using 1-D feature values extracted from the video frames and/or motion frames.

Figure 13:
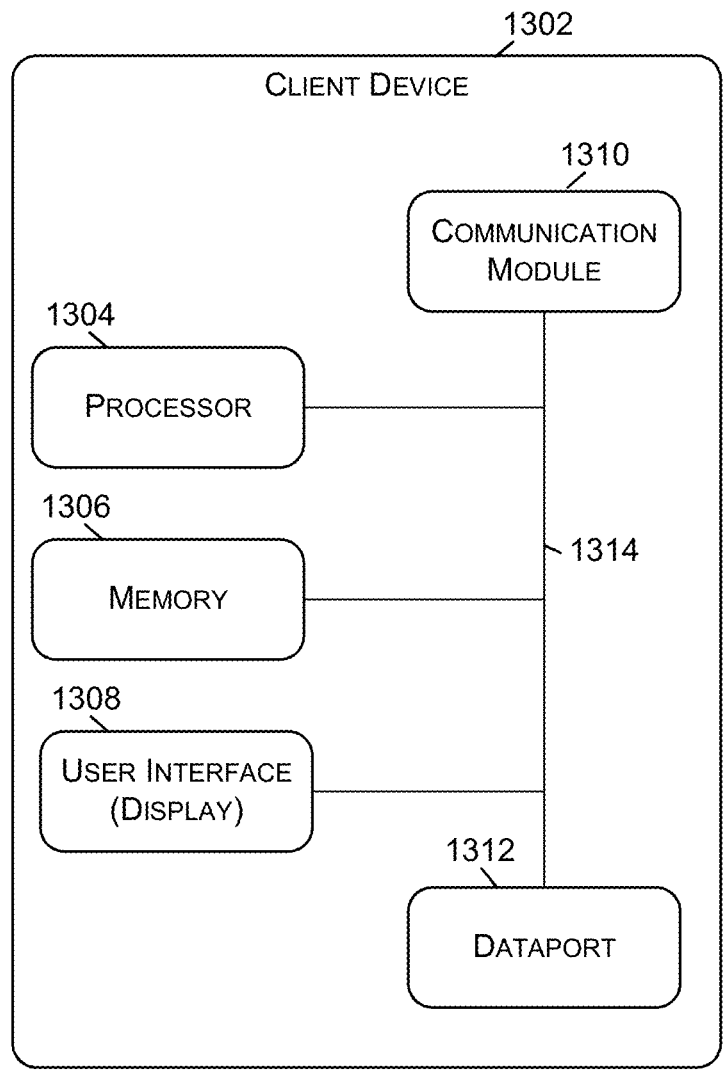
FIG. 13 is a functional block diagram of a client device on which the present embodiments may be implemented, according to various aspects of the present disclosure.

FIG. 13 is a functional block diagram of a client device 1302 on which the present embodiments may be implemented according to various aspects of the present disclosure. The client device(s) 214, 216 described with reference to FIG. 2 may include some or all of the components and/or functionality of the client device 1302. The client device 1302 may comprise, for example, a smartphone.

With reference to FIG. 13, the client device 1302 includes a processor 1304, a memory 1306, a user interface 1308, a communication module 1310, and a dataport 1312. These components are communicatively coupled together by an interconnect bus 1314. The processor 1304 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1306 may include both operating memory, such as random-access memory (RAM), as well as data storage, such as read-only memory (ROM), hard drives, flash memory, or any other suitable memory/storage element. The memory 1306 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1304 and the memory 1306 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1304 may be connected to the memory 1306 via the dataport 1312.

The user interface 1308 may include any user interface or presentation elements suitable for a smartphone and/or a portable computing device, such as a keypad, a display screen, a touchscreen, a microphone, and a speaker. The communication module 1310 is configured to handle communication links between the client device 1302 and other, external devices or receivers, and to route incoming/outgoing data appropriately. For example, inbound data from the dataport 1312 may be routed through the communication module 1310 before being directed to the processor 1304, and outbound data from the processor 1304 may be routed through the communication module 1310 before being directed to the dataport 1312. The communication module 1310 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1312 may be any type of connector used for physically interfacing with a smartphone and/or a portable computing device, such as a mini-USB port or an IPHONE®/IPOD® 30-pin connector or LIGHTNING® connector. In other embodiments, the dataport 1312 may include multiple communication channels for simultaneous communication with, for example, other processors, servers, and/or client terminals.

The memory 1306 may store instructions for communicating with other systems, such as a computer. The memory 1306 may store, for example, a program (e.g., computer program code) adapted to direct the processor 1304 in accordance with the present embodiments. The instructions also may include program elements, such as an operating system. While execution of sequences of instructions in the program causes the processor 1304 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 14:
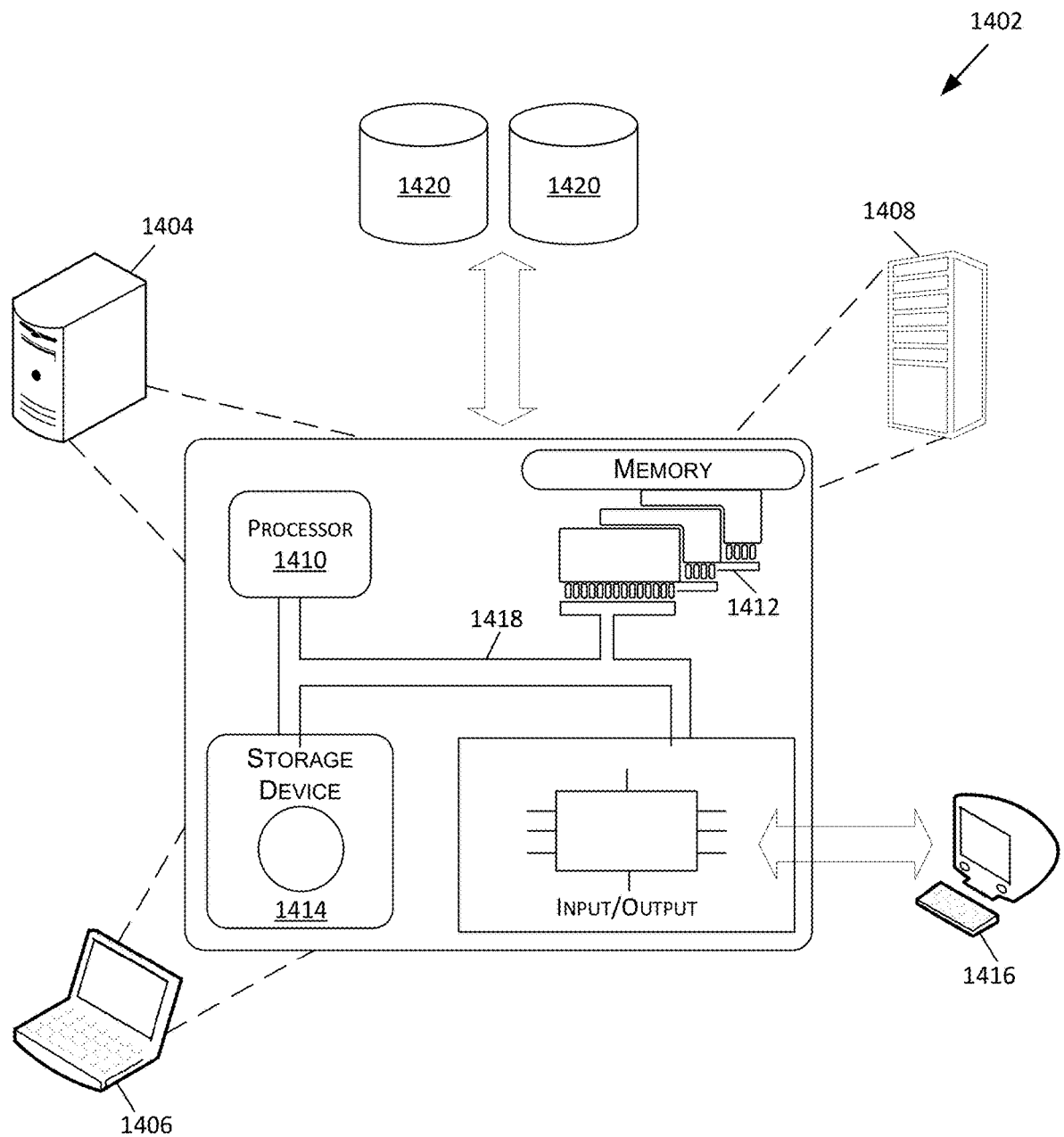
FIG. 14 is a functional block diagram of a general-purpose computing system on which the present embodiments may be implemented, according to various aspects of present disclosure.

FIG. 14 is a functional block diagram of a general-purpose computing system on which the present embodiments may be implemented according to various aspects of the present disclosure. The computer system 1402 may be embodied in at least one of a personal computer (also referred to as a desktop computer) 1404, a portable computer (also referred to as a laptop or notebook computer) 1406, and/or a server 1408 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1402 may execute at least some of the operations described above. The computer system 1402 may include at least one processor 1410, memory 1412, at least one storage device 1414, and input/output (I/O) devices 1416. Some or all of the components 1410, 1412, 1414, 1416 may be interconnected via a system bus 1418. The processor 1410 may be single- or multi-threaded and may have one or more cores. The processor 1410 execute instructions, such as those stored in the memory 1412 and/or in the storage device 1414. Information may be received and output using one or more I/O devices 1416.

The memory 1412 may store information, and may be a computer-readable medium, such as volatile or non-volatile memory. The storage device(s) 1414 may provide storage for the system 1402 and, in some embodiments, may be a computer-readable medium. In various aspects, the storage device(s) 1414 may be a flash memory device, a hard disk device, an optical disk device, a tape device, or any other type of storage device.

The I/O devices 1416 may provide input/output operations for the system 1402. The I/O devices 1416 may include a keyboard, a pointing device, and/or a microphone. The I/O devices 1416 may further include a display unit for displaying graphical user interfaces, a speaker, and/or a printer. External data may be stored in one or more accessible external databases 1420.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

In a first aspect, a motion-sensitive device adapted to perform an action triggered by motion detection is provided. The device includes a camera, at least one processor, and memory storing instructions that, upon execution by the at least one processor, cause the device to perform operations. The operations include recording, by the camera, video comprising a plurality of original-quality frames. The operations also include downsampling the plurality of original-quality frames to generate a respective plurality of reduced-quality frames. Each reduced-quality frame is a lower resolution and grayscale approximation of its respective original-quality frame. Each reduced-quality frame comprises a plurality of pixel values. The operations further include generating a set of motion frames based on the plurality of reduced-quality frames. Each motion frame is based on a difference in respective pixel values between a pair of reduced-quality frames. Each motion frame comprises a plurality of pixel values. Additionally, the operations include calculating one or more one-dimensional (1-D) statistical similarity feature values based on the pixel values of the motion frame for each motion frame of the set of motion frames. Furthermore, the operations include calculating a spatial correlation value based on the pixel values of the reduced-quality frame for each reduced-quality frame of the plurality of reduced-quality frames. The operations additionally include determining, using a pre-trained motion classifier, that the video represents irrelevant motion based on the 1-D statistical similarity feature values and the spatial correlation values. The operations further include suppressing the action triggered by motion detection from being performed by the device based on the determination that the video represents irrelevant motion.

In an embodiment of the first aspect, calculating the one or more 1-D statistical similarity feature values involves calculating (i) a mean value of the pixel values of each motion frame and (ii) a standard deviation of the pixel values of each motion frame.

In another embodiment of the first aspect, the memory storing further instructions that, upon execution by the at least one processor, cause the device to perform additional operations. The operations further include calculating a discrete cosine transformation (DCT) value for the pixel values of the motion frame for each motion frame of the set of motion frames. The operations additionally include determining that the video represents irrelevant motion is further based on the DCT values associated with the set of motion frames.

In a second aspect, a device is provided. The device includes a camera, at least one processor, and memory storing instructions that, upon execution by the at least one processor, cause the device to perform operations. The operations include recording, by the camera, video comprising at least a first frame and a second frame. The operations also include generating a first lower-resolution frame based on the first frame. The operations further include generating a second lower-resolution frame based on the second frame. Additionally, the operations include generating a motion frame based on the first lower-resolution frame and the second lower-resolution frame. The motion frame includes a plurality of pixel values. Further, the operations include calculating, based on the plurality of pixel values of the motion frame, one or more statistical similarity feature values. The operations additionally include classifying at least the first frame and the second frame as being representative of irrelevant motion based on the one or more statistical similarity feature values.

In an embodiment of the second aspect, the memory storing further instructions that, upon execution by the at least one processor, cause the device to perform additional operations. The operations include determining not to perform an action by the device, based on at least the first frame and the second frame being representative of irrelevant motion.

In another embodiment of the second aspect, each of the one or more statistical similarity feature values is a one-dimensional (1-D) statistical similarity feature value.

In another embodiment of the second aspect, the first lower-resolution frame includes a plurality of pixel values, the second lower-resolution frame includes a plurality of pixel values. In this embodiment, generating the motion frame based on the first lower-resolution frame and the second lower-resolution frame includes generating the motion frame based on a difference between each pixel value of the first lower-resolution frame and each respective pixel value of the second reduced quality frame.

In another embodiment of the second aspect, generating the motion frame based on the first lower-resolution frame and the second lower-resolution frame includes generating, using optical flow, the motion frame based on the first lower-resolution frame and the second lower-resolution frame.

In another embodiment of the second aspect, generating the motion frame based on the first lower-resolution frame and the second lower-resolution frame includes generating, using background subtraction, the motion frame based on the first lower-resolution frame and the second lower-resolution frame.

In another embodiment of the second aspect, calculating, based on the plurality of pixel values of the motion frame, the one or more statistical similarity feature values includes calculating a mean value of the pixel values of the motion frame.

In another embodiment of the second aspect, calculating, based on the plurality of pixel values of the motion frame, the one or more statistical similarity feature values includes calculating a standard deviation of the pixel values of the motion frame.

In another embodiment of the second aspect, calculating, based on the plurality of pixel values of the motion frame, the one or more statistical similarity feature values includes calculating a skewness of the pixel values of the motion frame.

In another embodiment of the second aspect, calculating, based on the plurality of pixel values of the motion frame, the one or more statistical similarity feature values calculating a kurtosis of the pixel values of the motion frame.

In another embodiment of the second aspect, classifying at least the first frame and the second frame as being representative of irrelevant motion based on the one or more statistical similarity feature values includes predicting, using a pre-trained model and the one or more statistical similarity feature values, that the first frame and the second frame are representative of irrelevant motion.

In an embodiment of the second aspect, the first lower-resolution frame includes a plurality of pixel values and the second lower-resolution frame includes a plurality of pixel values, and the memory storing further instructions that, upon execution by the at least one processor, cause the device to perform additional operations. The additional operations include calculating, based on the plurality of pixel values in the first lower-resolution frame and the plurality of pixel values in the second lower-resolution frame, a correlation coefficient indicative of a consistency across the first lower-resolution frame and the second lower-resolution frame. In this embodiment, classifying the second frame as being representative of irrelevant motion is further based on the correlation coefficient.

In an embodiment of the second aspect, the memory storing further instructions that, upon execution by the at least one processor, cause the device to perform additional operations. The additional operations include calculating, based on the plurality of pixel values of the motion frame, one or more linear transformation coefficients. In this embodiment, classifying at least the first frame and the second frame as being representative of irrelevant motion is further based on the one or more linear transformation coefficients.

In an embodiment of the second aspect, calculating the one or more linear transformation coefficients calculating, based on the plurality of pixel values of the motion frame, a coefficient of a discrete cosine transform (DCT).

In an embodiment of the second aspect, the video further comprises a third frame and a fourth frame, the motion frame is a first motion frame, the one or more statistical similarity feature values are associated with the first motion frame, and the memory storing further instructions that, upon execution by the at least one processor, cause the device to perform additional operations. The additional operations include generating a third lower-resolution frame based on the third frame, wherein the third lower-resolution frame includes a plurality of pixel values. The additional operations also include generating a fourth lower-resolution frame based on the fourth frame, wherein the third lower-resolution frame includes a plurality of pixel values. The additional operations further include generating a second motion frame based on a difference between the plurality of pixel values of the third lower-resolution frame and the plurality of pixel values of the fourth lower-resolution frame. Further, the additional operations include calculating, based on the plurality of pixel values of the second motion frame, one or more statistical similarity feature values associated with the second motion frame. The additional operations also include calculating a secondary feature value based on (i) a statistical similarity feature value of a particular statistical similarity feature associated with the first motion frame, and (ii) a statistical similarity feature value of the particular statistical similarity feature associated with the second motion frame. In this embodiment, classifying the first frame and the second frame as being representative of irrelevant motion is further based on the secondary feature value.

In an embodiment of the second aspect, calculating the secondary feature value includes the secondary feature value as at least one of the following: (i) a mean value of a particular statistical similarity feature value associated with the first motion frame and the particular statistical similarity feature value associated with the second motion frame; (ii) a variance value of the particular statistical similarity feature value associated with the first motion frame and the particular statistical similarity feature value associated with the second motion frame; and (iii) one or more coefficients of a best-fit polynomial for the particular statistical similarity feature value associated with the first motion frame and the particular statistical similarity feature value associated with the second motion frame.

In an embodiment of the second aspect, at least the statistical similarity feature value of the particular statistical similarity feature associated with the first motion frame and the statistical similarity feature value of the particular statistical similarity feature associated with the second motion frame include a statistical similarity feature spline. In this embodiment, classifying at least the first frame and the second frame as being representative of irrelevant motion involves calculating a magnitude of a frequency component of the statistical similarity feature spline, and classifying at least the first frame and the second frame as being representative of irrelevant motion based on the magnitude of the frequency component of the statistical similarity feature spline exceeding a threshold magnitude.

In an embodiment of the second aspect, at least the statistical similarity feature value of the particular statistical similarity feature associated with the first motion frame and the statistical similarity feature value of the particular statistical similarity feature associated with the second motion frame include a statistical similarity feature spline. In this embodiment, classifying at least the first frame and the second frame as being representative of irrelevant motion includes (i) calculating a running average of the statistical similarity feature based at least in part on the statistical similarity feature value of the particular statistical similarity feature associated with the first motion frame and the statistical similarity feature value of the particular statistical similarity feature associated with the second motion frame, and (ii) classifying at least the first frame and the second frame as being representative of irrelevant motion based on a difference between the running average of the statistical similarity feature at the first motion frame and the running average of the statistical similarity feature at the second motion frame being below a threshold difference.

In embodiment of the second aspect, suppressing the action triggered by motion detection includes at least one of the following: suppressing storage of a video segment; and suppressing a user alert.

In a third aspect, a method is provided. The method includes obtaining a first frame and a second frame. The first frame and the second frame each include a respective plurality of pixel values. The method also includes calculating, based on the pixel values of the first frame and the second frame, a one-dimensional (1-D) feature value representative of a characteristic associated with the first frame and the second frame. The method further includes classifying the second frame as indicative of irrelevant motion based at least in part on the 1-D feature value. Additionally, the method includes suppressing the performance of a motion-triggered action based on the classifying of the second frame as indicative of irrelevant motion.

In an embodiment of the third aspect, calculating the 1-D feature value includes calculating, based on the plurality of pixel values in the first frame and the plurality of pixel values in the second frame, a two-dimensional (2-D) correlation coefficient. In this embodiment, classifying the second frame as indicative of irrelevant motion is further based on the 2-D correlation coefficient.

In an embodiment of the third aspect, calculating the 1-D feature value includes (i) generating a motion frame based on a difference between the plurality of pixel values of the first frame and the plurality of pixel values of the second frame, the motion frame having a plurality of pixel values and (ii) calculating, based on the plurality of pixel values of the motion frame, one or more 1-D linear transformation coefficients. In this embodiment, classifying the second frame as indicative of irrelevant motion is further based on the one or more 1-D linear transformation coefficients.

What is claimed is:

1. A motion-sensitive device adapted to perform an action triggered by motion detection, the device comprising:
a camera;
at least one processor; and
memory storing instructions that, upon execution by the at least one processor, cause the device to perform operations comprising:
recording, by the camera, video comprising a plurality of original-quality frames;
downsampling the plurality of original-quality frames to generate a respective plurality of reduced-quality frames, wherein each reduced-quality frame is a lower resolution and grayscale approximation of its respective original-quality frame, and wherein each reduced-quality frame comprises a plurality of pixel values;
generating a set of motion frames based on the plurality of reduced-quality frames, wherein each motion frame is based on a pixel-by-pixel difference in respective pixel values between a first reduced-quality frame and a second reduced-quality frame of the plurality of reduced-quality frames, and wherein each motion frame comprises a plurality of pixel values;
for each motion frame of the set of motion frames, calculating one or more one-dimensional (1-D) statistical similarity feature values based on the pixel values of the motion frame;
for each reduced-quality frame of the plurality of reduced-quality frames, calculating a spatial correlation value based on the pixel values of the reduced-quality frame;
determining, using a pre-trained motion classifier, that the video represents irrelevant motion based on the 1-D statistical similarity feature values and the spatial correlation values; and
based on the determination that the video represents irrelevant motion, suppressing the action triggered by motion detection from being performed by the device.

2. The device of claim 1, wherein calculating the one or more 1-D statistical similarity feature values comprises:
calculating (i) a mean value of the pixel values of each motion frame and (ii) a standard deviation of the pixel values of each motion frame.

3. The device of claim 1, the memory storing further instructions that, upon execution by the at least one processor, cause the device to perform further operations comprising:
for each motion frame of the set of motion frames, calculating a discrete cosine transformation (DCT) value for the pixel values of the motion frame,
wherein determining that the video represents irrelevant motion is further based on the DCT values associated with the set of motion frames.

4. A device comprising:
a camera;
at least one processor; and
memory storing instructions that, upon execution by the at least one processor, cause the device to perform operations comprising:
recording, by the camera, video comprising at least a first frame and a second frame;
generating a first lower-resolution frame based on the first frame;
generating a second lower-resolution frame based on the second frame;
generating a motion frame based on the first lower-resolution frame and the second lower-resolution frame, wherein the motion frame includes a plurality of pixel values, wherein each motion frame is based on a pixel-by-pixel difference in respective pixel values between the first lower-resolution frame and the second lower-resolution frame;
calculating, based on the plurality of pixel values of the motion frame, one or more statistical similarity feature values; and
classifying at least the first frame or the second frame as being representative of irrelevant motion based on the one or more statistical similarity feature values.

5. The device of claim 4, the memory storing further instructions that, upon execution by the at least one processor, cause the device to perform further operations comprising:
based on at least the first frame and the second frame being representative of irrelevant motion, determining not to perform an action by the device.

6. The device of claim 4, wherein each of the one or more statistical similarity feature values is a one-dimensional (1-D) statistical similarity feature value.

7. The device of claim 4, wherein the first lower-resolution frame includes a plurality of pixel values, wherein the second lower-resolution frame includes a plurality of pixel values, and wherein generating the motion frame based on the first lower-resolution frame and the second lower-resolution frame comprises:
generating the motion frame based on a difference between each pixel value of the first lower-resolution frame and each respective pixel value of the second reduced quality frame.

8. The device of claim 4, wherein generating the motion frame based on the first lower-resolution frame and the second lower-resolution frame comprises:
generating, using optical flow, the motion frame based on the first lower-resolution frame and the second lower-resolution frame.

9. The device of claim 4, wherein generating the motion frame based on the first lower-resolution frame and the second lower-resolution frame comprises:
generating, using background subtraction, the motion frame based on the first lower-resolution frame and the second lower-resolution frame.

10. The device of claim 4, wherein calculating, based on the plurality of pixel values of the motion frame, the one or more statistical similarity feature values comprises:
calculating a mean value of the pixel values of the motion frame.

11. The device of claim 4, wherein calculating, based on the plurality of pixel values of the motion frame, the one or more statistical similarity feature values comprises:
calculating a standard deviation of the pixel values of the motion frame.

12. The device of claim 4, wherein calculating, based on the plurality of pixel values of the motion frame, the one or more statistical similarity feature values comprises:
calculating a skewness of the pixel values of the motion frame.

13. The device of claim 4, wherein calculating, based on the plurality of pixel values of the motion frame, the one or more statistical similarity feature values comprises:
calculating a kurtosis of the pixel values of the motion frame.

14. The device of claim 4, wherein classifying at least the first frame and the second frame as being representative of irrelevant motion based on the one or more statistical similarity feature values comprises:
predicting, using a pre-trained model and the one or more statistical similarity feature values, that the first frame and the second frame are representative of irrelevant motion.

15. The device of claim 4, wherein the first lower-resolution frame includes a plurality of pixel values, wherein the second lower-resolution frame includes a plurality of pixel values, and the memory storing further instructions that, upon execution by the at least one processor, cause the device to perform further operations comprising:
calculating, based on the plurality of pixel values in the first lower-resolution frame and the plurality of pixel values in the second lower-resolution frame, a correlation coefficient indicative of a consistency across the first lower-resolution frame and the second lower-resolution frame,
wherein classifying the second frame as being representative of irrelevant motion is further based on the correlation coefficient.

16. The device of claim 4, the memory storing further instructions that, upon execution by the at least one processor, cause the device to perform further operations comprising:
calculating, based on the plurality of pixel values of the motion frame, one or more linear transformation coefficients,
wherein classifying at least the first frame and the second frame as being representative of irrelevant motion is further based on the one or more linear transformation coefficients.

17. The device of claim 16, wherein calculating the one or more linear transformation coefficients comprises:
calculating, based on the plurality of pixel values of the motion frame, a coefficient of a discrete cosine transform (DCT).

18. The device of claim 4, wherein the video further comprises a third frame and a fourth frame, wherein the motion frame is a first motion frame, wherein the one or more statistical similarity feature values are associated with the first motion frame, and the memory storing further instructions that, upon execution by the at least one processor, cause the device to perform further operations comprising:
generating a third lower-resolution frame based on the third frame, wherein the third lower-resolution frame includes a plurality of pixel values;
generating a fourth lower-resolution frame based on the fourth frame, wherein the third lower-resolution frame includes a plurality of pixel values;
generating a second motion frame based on a difference between the plurality of pixel values of the third lower-resolution frame and the plurality of pixel values of the fourth lower-resolution frame;

calculating, based on the plurality of pixel values of the second motion frame, one or more statistical similarity feature values associated with the second motion frame; and
calculating a secondary feature value based on (i) a statistical similarity feature value of a particular statistical similarity feature associated with the first motion frame, and (ii) a statistical similarity feature value of the particular statistical similarity feature associated with the second motion frame,
wherein classifying the first frame and the second frame as being representative of irrelevant motion is further based on the secondary feature value.

19. The device of claim 18, wherein calculating the secondary feature value comprises:
calculating the secondary feature value as at least one of the following: (i) a mean value of a particular statistical similarity feature value associated with the first motion frame and the particular statistical similarity feature value associated with the second motion frame; (ii) a variance value of the particular statistical similarity feature value associated with the first motion frame and the particular statistical similarity feature value associated with the second motion frame; and (iii) one or more coefficients of a best-fit polynomial for the particular statistical similarity feature value associated with the first motion frame and the particular statistical similarity feature value associated with the second motion frame.

20. The device of claim 18, wherein at least the statistical similarity feature value of the particular statistical similarity feature associated with the first motion frame and the statistical similarity feature value of the particular statistical similarity feature associated with the second motion frame comprise a statistical similarity feature spline, and wherein classifying at least the first frame and the second frame as being representative of irrelevant motion further comprises:
calculating a magnitude of a frequency component of the statistical similarity feature spline; and
based on the magnitude of the frequency component of the statistical similarity feature spline exceeding a threshold magnitude, classifying at least the first frame and the second frame as being representative of irrelevant motion.

21. The device of claim 18, wherein at least the statistical similarity feature value of the particular statistical similarity feature associated with the first motion frame and the statistical similarity feature value of the particular statistical similarity feature associated with the second motion frame comprise a statistical similarity feature spline, and wherein classifying at least the first frame and the second frame as being representative of irrelevant motion further comprises:
calculating a running average of the statistical similarity feature based at least in part on the statistical similarity feature value of the particular statistical similarity feature associated with the first motion frame and the statistical similarity feature value of the particular statistical similarity feature associated with the second motion frame; and
based on a difference between the running average of the statistical similarity feature at the first motion frame and the running average of the statistical similarity feature at the second motion frame being below a threshold difference, classifying at least the first frame and the second frame as being representative of irrelevant motion.

22. The device of claim 5, wherein suppressing the action triggered by motion detection comprises at least one of the following: suppressing storage of a video segment; and suppressing a user alert.

23. A method comprising:

obtaining a first frame and a second frame, wherein the first frame and the second frame each comprise a respective plurality of pixel values;

calculating, based on the pixel values of the first frame and the second frame, a one-dimensional (1-D) feature value representative of a characteristic associated with the first frame and the second frame, wherein the 1-D feature value is based on a pixel-by-pixel difference in respective pixel values of the first frame and the second frame;

based at least in part on the 1-D feature value, classifying the second frame as indicative of irrelevant motion; and based on the classifying of the second frame as indicative of irrelevant motion, suppressing the performance of a motion-triggered action.

24. The method of claim 23, wherein calculating the 1-D feature value comprises:

calculating, based on the plurality of pixel values in the first frame and the plurality of pixel values in the second frame, a two-dimensional (2-D) correlation coefficient, wherein classifying the second frame as indicative of irrelevant motion is further based on the 2-D correlation coefficient.

25. The method of claim 23, wherein calculating the 1-D feature value comprises:

generating a motion frame based on a difference between the plurality of pixel values of the first frame and the plurality of pixel values of the second frame, wherein the motion frame comprises a plurality of pixel values; and calculating, based on the plurality of pixel values of the motion frame, one or more 1-D linear transformation coefficients, wherein classifying the second frame as indicative of irrelevant motion is further based on the one or more 1-D linear transformation coefficients.

* * * * *